United States Patent
Suzuki et al.

(10) Patent No.: US 11,119,815 B2
(45) Date of Patent: Sep. 14, 2021

(54) MANAGEMENT APPARATUS, CONTROL METHOD OF CALCULATION RESOURCES, AND STORAGE MEDIUM

(71) Applicant: FUJITSU LIMITED, Kawasaki (JP)

(72) Inventors: Shigeto Suzuki, Kawasaki (JP); Hiroyoshi Kodama, Isehara (JP); Satoshi Inano, Minoh (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 233 days.

(21) Appl. No.: 16/281,452

(22) Filed: Feb. 21, 2019

(65) Prior Publication Data

US 2019/0188033 A1    Jun. 20, 2019

Related U.S. Application Data

(63) Continuation of application No. PCT/JP2018/000123, filed on Jan. 5, 2018.

(30) Foreign Application Priority Data

Jan. 19, 2017    (JP) .............................. JP2017-007695

(51) Int. Cl.
  *G06F 9/48*    (2006.01)
  *G06F 9/50*    (2006.01)
  *G06F 9/46*    (2006.01)

(52) U.S. Cl.
  CPC .............. *G06F 9/4843* (2013.01); *G06F 9/46* (2013.01); *G06F 9/50* (2013.01); *G06F 9/5077* (2013.01); *G06F 2209/501* (2013.01)

(58) Field of Classification Search
  None
  See application file for complete search history.

(56) References Cited

U.S. PATENT DOCUMENTS 8,095,929 B1 *  1/2012  Ji ........................... G06F 9/4856
                                                        718/1
8,117,387 B2 *  2/2012  Matsuki ................ G06F 3/0653
                                                        711/114

(Continued)

FOREIGN PATENT DOCUMENTS

JP    2009-199395    9/2009
JP    2010-113677    5/2010

(Continued)

OTHER PUBLICATIONS

International Search Report attached with the Written Opinion of the International Searching Authority, mailed in connection with PCT/JP2018/000123 and dated Apr. 3, 2018, with English translation (11 pages).

*Primary Examiner* — Van H Nguyen
(74) *Attorney, Agent, or Firm* — Fujitsu Patent Center

(57) ABSTRACT

A management apparatus includes a memory; and a processor configured to: store configuration information and performance information for each of a plurality of information processing apparatuses acquired from a host OS executed by each of a plurality of groups to which the plurality of information processing apparatuses belong and each of which provides a given service into the memory for each of the plurality of groups, select, based on the configuration information and the performance information, a movement target virtual machine for each of the plurality of groups, when the movement target virtual machine is moved to the different group, determine whether a performance value of a service corresponding to the movement target virtual machine satisfies a reference value, and when it is determined that the performance value satisfies the reference value, determine to move the movement target virtual machine from the target group to the different group.

13 Claims, 36 Drawing Sheets

(56) References Cited

U.S. PATENT DOCUMENTS

| | | | |
|---|---|---|---|
| 8,732,699 B1* | 5/2014 | Hyser | G06F 9/5077 |
| | | | 718/1 |
| 9,003,409 B2* | 4/2015 | Dow | G06F 9/45558 |
| | | | 718/1 |
| 9,384,115 B2* | 7/2016 | Elisha | H04L 41/0806 |
| 9,535,738 B2* | 1/2017 | Bernal | G06F 9/5077 |
| 9,594,579 B2* | 3/2017 | Shiva | G06F 9/4862 |
| 10,467,048 B2* | 11/2019 | Dong | G06F 9/45558 |
| 2009/0210527 A1 | 8/2009 | Kawato | |
| 2011/0161483 A1 | 6/2011 | Takemura | |
| 2013/0238804 A1 | 9/2013 | Tanino et al. | |
| 2014/0165063 A1* | 6/2014 | Shiva | G06F 9/45533 |
| | | | 718/1 |
| 2014/0351412 A1* | 11/2014 | Elisha | H04L 43/0817 |
| | | | 709/224 |

FOREIGN PATENT DOCUMENTS

| | | |
|---|---|---|
| JP | 2010-140134 | 6/2010 |
| JP | 2010-271863 | 12/2010 |
| JP | 2016-110248 | 6/2016 |
| WO | 2007/136021 | 11/2007 |
| WO | 2010/024027 | 3/2010 |
| WO | 2012/066640 | 5/2012 |

* cited by examiner

| VM TYPE | CPU | MEM | NET |
|---|---|---|---|
| Low Spec | E5-2623v3 Core2 | 8GB | 1Gbit/s |
| CPU RICH Spec | E5-2623v3 Core4 | 8GB | 1Gbit/s |
| MEM RICH Spec | E5-2623v3 Core2 | 16GB | 1Gbit/s |
| NET RICH Spec | E5-2623v3 Core4 | 8GB | 10Gbit/s |
| High Spec | E5-2623v3 Core4 | 16GB | 10Gbit/s |

FIG. 7

| VM GROUP | | | | | | | | |
|---|---|---|---|---|---|---|---|---|
| VIRTUAL MACHINE | | | | | TOTAL HARDWARE RESOURCE | | | |
| VM TYPE | CPU | MEM | NET | ... | CPU | MEM | NET | SERVICE PERFORMANCE | OBJECTIVE SERVICE PERFORMANCE |
| ... | ... | ... | ... | ... | ... | ... | ... | ... | ... |

| VM GROUP 1 | | | | | | | | | | | | | | | | | |
|---|---|---|---|---|---|---|---|---|---|---|---|---|---|---|---|---|---|
| VIRTUAL MACHINE A | | | | VIRTUAL MACHINE B | | | | VIRTUAL MACHINE C | | | | TOTAL HARDWARE RESOURCE | | | SERVICE PERFORMANCE | OBJECTIVE SERVICE PERFORMANCE |
| VM TYPE | CPU | MEM | NET | VM TYPE | CPU | MEM | NET | VM TYPE | CPU | MEM | NET | CPU | MEM | NET | | |
| Low Spec | 2CPU | 8GB | 1Gbit/s | Low Spec | 2CPU | 8GB | 1Gbit/s | Low Spec | 2CPU | 8GB | 1Gbit/s | | | | | |
| CPU Rich | 4CPU | 8GB | 1Gbit/s | " | " | " | " | " | " | " | " | | | | | |
| MEM Rich | 2CPU | 16GB | 1Gbit/s | " | " | " | " | " | " | " | " | | | | | |
| NET Rich | 2CPU | 8GB | 10Gbit/s | " | " | " | " | " | " | " | " | | | | | |
| High Spec | 4CPU | 16GB | 10Gbit/s | " | " | " | " | " | " | " | " | | | | | |
| Low Spec | 2CPU | 8GB | 1Gbit/s | Low Spec | 2CPU | 8GB | 1Gbit/s | Low Spec | 2CPU | 8GB | 1Gbit/s | | | | | 40usec |
| " | " | " | " | CPU Rich | 4CPU | 8GB | 1Gbit/s | " | " | " | " | | | | | |
| " | " | " | " | MEM Rich | 2CPU | 16GB | 1Gbit/s | " | " | " | " | | | | | |
| " | " | " | " | NET Rich | 2CPU | 8GB | 10Gbit/s | " | " | " | " | | | | | |
| " | " | " | " | High Spec | 4CPU | 16GB | 10Gbit/s | " | " | " | " | | | | | |
| Low Spec | 2CPU | 8GB | 1Gbit/s | Low Spec | 2CPU | 8GB | 1Gbit/s | CPU Rich | 4CPU | 8GB | 1Gbit/s | | | | | |
| " | " | " | " | " | " | " | " | MEM Rich | 2CPU | 16GB | 1Gbit/s | | | | | |
| " | " | " | " | " | " | " | " | NET Rich | 2CPU | 8GB | 10Gbit/s | | | | | |
| " | " | " | " | " | " | " | " | High Spec | 4CPU | 16GB | 10Gbit/s | | | | | |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | |

FIG. 11

| VM GROUP 1 | | | | | | | | | | | | | TOTAL HARDWARE RESOURCE | | | SERVICE PERFOR-MANCE | OBJECTIVE SERVICE PERFORMANCE |
|---|---|---|---|---|---|---|---|---|---|---|---|---|---|---|---|---|---|
| VIRTUAL MACHINE A | | | | VIRTUAL MACHINE B | | | | VIRTUAL MACHINE C | | | | | | | | | |
| VM TYPE | CPU | MEM | NET | VM TYPE | CPU | MEM | NET | VM TYPE | CPU | MEM | NET | | CPU | MEM | NET | | |
| Low Spec | 2CPU | 8GB | 1Gbit/s | Low Spec | 2CPU | 8GB | 1Gbit/s | Low Spec | 2CPU | 8GB | 1Gbit/s | | 6CPU | 24GB | 1Gbit/s x3 | 48usec | |
| CPU Rich | 4CPU | 8GB | 1Gbit/s | " | " | " | " | " | " | " | " | | | | | | |
| MEM Rich | 2CPU | 16GB | 1Gbit/s | " | " | " | " | " | " | " | " | | | | | | |
| NET Rich | 2CPU | 8GB | 10Gbit/s | " | " | " | " | " | " | " | " | | | | | | |
| High Spec | 4CPU | 16GB | 10Gbit/s | " | " | " | " | " | " | " | " | | | | | | |
| Low Spec | 2CPU | 8GB | 1Gbit/s | Low Spec | 2CPU | 8GB | 1Gbit/s | Low Spec | 2CPU | 8GB | 1Gbit/s | | | | | | 40usec |
| " | " | " | " | CPU Rich | 4CPU | 8GB | 1Gbit/s | " | " | " | " | | | | | | |
| " | " | " | " | MEM Rich | 2CPU | 16GB | 1Gbit/s | " | " | " | " | | | | | | |
| " | " | " | " | NET Rich | 2CPU | 8GB | 10Gbit/s | " | " | " | " | | | | | | |
| " | " | " | " | High Spec | 4CPU | 16GB | 10Gbit/s | " | " | " | " | | | | | | |
| Low Spec | 2CPU | 8GB | 1Gbit/s | Low Spec | 2CPU | 8GB | 1Gbit/s | CPU Rich | 4CPU | 8GB | 1Gbit/s | | | | | | |
| " | " | " | " | " | " | " | " | MEM Rich | 2CPU | 16GB | 1Gbit/s | | | | | | |
| " | " | " | " | " | " | " | " | NET Rich | 2CPU | 8GB | 10Gbit/s | | | | | | |
| " | " | " | " | " | " | " | " | High Spec | 4CPU | 16GB | 10Gbit/s | | | | | | |
| ... | ... | ... | ... | ... | ... | ... | ... | ... | ... | ... | ... | | ... | ... | ... | ... | |

FIG. 12

| VM GROUP 1 | | | | | | | | | | | | | | | | | |
|---|---|---|---|---|---|---|---|---|---|---|---|---|---|---|---|---|---|
| VIRTUAL MACHINE A | | | | VIRTUAL MACHINE B | | | | VIRTUAL MACHINE C | | | | TOTAL HARDWARE RESOURCE | | | | SERVICE PERFOR-MANCE | OBJECTIVE SERVICE PERFORMANCE |
| VM TYPE | CPU | MEM | NET | VM TYPE | CPU | MEM | NET | VM TYPE | CPU | MEM | NET | CPU | MEM | NET | | | |
| Low Spec | 2CPU | 8GB | 1Gbit/s | Low Spec | 2CPU | 8GB | 1Gbit/s | Low Spec | 2CPU | 8GB | 1Gbit/s | 6CPU | 24GB | 1Gbit/s x3 | 48usec | | |
| CPU Rich | 4CPU | 8GB | 1Gbit/s | " | " | " | " | " | " | " | " | | | | | | |
| MEM Rich | 2CPU | 16GB | 1Gbit/s | " | " | " | " | " | " | " | " | | | | | | |
| NET Rich | 2CPU | 8GB | 10Gbit/s | " | " | " | " | " | " | " | " | | | | | | |
| High Spec | 4CPU | 16GB | 10Gbit/s | " | " | " | " | " | " | " | " | 8CPU | 32GB | 1Gbit/s x2 10Gbit/s x1 | 38usec | | 40usec |
| Low Spec | 2CPU | 8GB | 1Gbit/s | Low Spec | 2CPU | 8GB | 1Gbit/s | Low Spec | 2CPU | 8GB | 1Gbit/s | | | | | | |
| " | " | " | " | CPU Rich | 4CPU | 8GB | 1Gbit/s | " | " | " | " | | | | | | |
| " | " | " | " | MEM Rich | 2CPU | 16GB | 1Gbit/s | " | " | " | " | | | | | | |
| " | " | " | " | NET Rich | 2CPU | 8GB | 10Gbit/s | " | " | " | " | | | | | | |
| " | " | " | " | High Spec | 4CPU | 16GB | 10Gbit/s | " | " | " | " | | | | | | |
| Low Spec | 2CPU | 8GB | 1Gbit/s | Low Spec | 2CPU | 8GB | 1Gbit/s | CPU Rich | 4CPU | 8GB | 1Gbit/s | | | | | | |
| " | " | " | " | " | " | " | " | MEM Rich | 2CPU | 16GB | 1Gbit/s | | | | | | |
| " | " | " | " | " | " | " | " | NET Rich | 2CPU | 8GB | 10Gbit/s | | | | | | |
| " | " | " | " | " | " | " | " | High Spec | 4CPU | 16GB | 10Gbit/s | | | | | | |
| ... | ... | ... | ... | ... | ... | ... | ... | ... | ... | ... | ... | ... | ... | ... | ... | | |

FIG. 13

VM GROUP 1

| | VIRTUAL MACHINE A | | | | VIRTUAL MACHINE B | | | | VIRTUAL MACHINE C | | | | TOTAL HARDWARE RESOURCE | | | SERVICE PERFOR-MANCE | OBJECTIVE SERVICE PERFORMANCE |
|---|---|---|---|---|---|---|---|---|---|---|---|---|---|---|---|---|---|
| | VM TYPE | CPU | MEM | NET | VM TYPE | CPU | MEM | NET | VM TYPE | CPU | MEM | NET | CPU | MEM | NET | | |
| 1100 | Low Spec | 2CPU | 8GB | 1Gbit/s | Low Spec | 2CPU | 8GB | 1Gbit/s | Low Spec | 2CPU | 8GB | 1Gbit/s | 6CPU | 24GB | 1Gbit/s x3 | 48usec | |
| 1300 | CPU Rich | 4CPU | 8GB | 1Gbit/s | " | " | " | " | " | " | " | " | 8CPU | 24GB | 1Gbit/s x3 | 48usec | |
| 1301 | MEM Rich | 2CPU | 16GB | 1Gbit/s | " | " | " | " | " | " | " | " | 6CPU | 32GB | 1Gbit/s x3 | 46usec | |
| 1302 | NET Rich | 2CPU | 8GB | 10Gbit/s | " | " | " | " | " | " | " | " | 6CPU | 24GB | 1Gbit/s x2 10Gbit/s x1 | 45usec | |
| | High Spec | 4CPU | 16GB | 10Gbit/s | " | " | " | " | " | " | " | " | 8CPU | 32GB | 1Gbit/s x2 10Gbit/s x1 | 38usec | |
| 1200 | Low Spec | 2CPU | 8GB | 1Gbit/s | Low Spec | 2CPU | 8GB | 1Gbit/s | Low Spec | 2CPU | 8GB | 1Gbit/s | | | | | 40usec |
| | " | " | " | " | CPU Rich | 4CPU | 8GB | 1Gbit/s | " | " | " | " | | | | | |
| | " | " | " | " | MEM Rich | 2CPU | 16GB | 1Gbit/s | " | " | " | " | | | | | |
| | " | " | " | " | NET Rich | 2CPU | 8GB | 10Gbit/s | " | " | " | " | | | | | |
| | " | " | " | " | High Spec | 4CPU | 16GB | 10Gbit/s | " | " | " | " | | | | | |
| | " | " | " | " | Low Spec | 2CPU | 8GB | 1Gbit/s | CPU Rich | 4CPU | 8GB | 1Gbit/s | | | | | |
| | " | " | " | " | " | " | " | " | MEM Rich | 2CPU | 16GB | 1Gbit/s | | | | | |
| | " | " | " | " | " | " | " | " | NET Rich | 2CPU | 8GB | 10Gbit/s | | | | | |
| | " | " | " | " | " | " | " | " | High Spec | 4CPU | 16GB | 10Gbit/s | | | | | |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | |

VM GROUP 1

| | VIRTUAL MACHINE A | | | | VIRTUAL MACHINE B | | | | VIRTUAL MACHINE C | | | | TOTAL HARDWARE RESOURCE | | | SERVICE PERFOR-MANCE | OBJECTIVE SERVICE PERFORMANCE |
|---|---|---|---|---|---|---|---|---|---|---|---|---|---|---|---|---|---|
| | VM TYPE | CPU | MEM | NET | VM TYPE | CPU | MEM | NET | VM TYPE | CPU | MEM | NET | CPU | MEM | NET | | |
| 1100 | Low Spec | 2CPU | 8GB | 1Gbit/s | Low Spec | 2CPU | 8GB | 1Gbit/s | Low Spec | 2CPU | 8GB | 1Gbit/s | 6CPU | 24GB | 1Gbit/s x3 | 48usec | |
| 1300 | CPU Rich | 4CPU | 8GB | 1Gbit/s | " | " | " | " | " | " | " | " | 8CPU | 24GB | 1Gbit/s x3 | 48usec | |
| 1301 | MEM Rich | 2CPU | 16GB | 1Gbit/s | " | " | " | " | " | " | " | " | 6CPU | 32GB | 1Gbit/s x3 | 46usec | |
| 1302 | NET Rich | 2CPU | 8GB | 10Gbit/s | " | " | " | " | " | " | " | " | 6CPU | 24GB | 1Gbit/s x2 10Gbit/s x1 | 45usec | 40usec |
| 1200 | High Spec | 4CPU | 16GB | 10Gbit/s | " | " | " | " | " | " | " | " | 8CPU | 32GB | 1Gbit/s x2 10Gbit/s x1 | 38usec | |
| 1400 | Low Spec | 2CPU | 8GB | 1Gbit/s | Low Spec | 2CPU | 8GB | 1Gbit/s | Low Spec | 2CPU | 8GB | 1Gbit/s | 6CPU | 24GB | 1Gbit/s x3 | 48usec | |
| | " | " | " | " | CPU Rich | 4CPU | 8GB | 1Gbit/s | CPU Rich | 4CPU | 8GB | 1Gbit/s | | | | | |
| | " | " | " | " | MEM Rich | 2CPU | 16GB | 1Gbit/s | MEM Rich | 2CPU | 16GB | 1Gbit/s | | | | | |
| | " | " | " | " | NET Rich | 2CPU | 8GB | 10Gbit/s | NET Rich | 2CPU | 8GB | 10Gbit/s | | | | | |
| | " | " | " | " | High Spec | 4CPU | 16GB | 10Gbit/s | High Spec | 4CPU | 16GB | 10Gbit/s | | | | | |
| | Low Spec | 2CPU | 8GB | 1Gbit/s | Low Spec | 2CPU | 8GB | 1Gbit/s | Low Spec | 2CPU | 8GB | 1Gbit/s | | | | | |
| | " | " | " | " | " | " | " | " | " | " | " | " | | | | | |
| | " | " | " | " | " | " | " | " | " | " | " | " | | | | | |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | |

FIG. 15

| | VM GROUP 1 | | | | | | | | | | | | | TOTAL HARDWARE RESOURCE | | | SERVICE PERFOR-MANCE | OBJECTIVE SERVICE PERFORMANCE |
|---|---|---|---|---|---|---|---|---|---|---|---|---|---|---|---|---|---|---|
| | VIRTUAL MACHINE A | | | | VIRTUAL MACHINE B | | | | VIRTUAL MACHINE C | | | | CPU | MEM | NET | | |
| | VM TYPE | CPU | MEM | NET | VM TYPE | CPU | MEM | NET | VM TYPE | CPU | MEM | NET | | | | | |
| 1100 | Low Spec | 2CPU | 8GB | 1Gbit/s | Low Spec | 2CPU | 8GB | 1Gbit/s | Low Spec | 2CPU | 8GB | 1Gbit/s | | 6CPU | 24GB | 1Gbit/s x3 | 48usec | 40usec |
| 1300 | CPU Rich | 4CPU | 8GB | 1Gbit/s | " | " | " | " | " | " | " | " | | 8CPU | 24GB | 1Gbit/s x3 | 48usec | |
| 1301 | MEM Rich | 2CPU | 16GB | 1Gbit/s | " | " | " | " | " | " | " | " | | 6CPU | 32GB | 1Gbit/s x3 | 46usec | |
| 1302 | NET Rich | 2CPU | 8GB | 10Gbit/s | " | " | " | " | " | " | " | " | | 6CPU | 24GB | 1Gbit/s x2 10Gbit/s x1 | 45usec | |
| 1200 | High Spec | 4CPU | 16GB | 10Gbit/s | " | " | " | " | " | " | " | " | | 8CPU | 32GB | 1Gbit/s x2 10Gbit/s x1 | 38usec | |
| 1400 | Low Spec | 2CPU | 8GB | 1Gbit/s | Low Spec | 2CPU | 8GB | 1Gbit/s | Low Spec | 2CPU | 8GB | 1Gbit/s | | 6CPU | 24GB | 1Gbit/s x3 | 48usec | |
| | " | " | " | " | CPU Rich | 4CPU | 8GB | 1Gbit/s | " | " | " | " | | | | | | |
| | " | " | " | " | MEM Rich | 2CPU | 16GB | 1Gbit/s | " | " | " | " | | | | | | |
| | " | " | " | " | NET Rich | 2CPU | 8GB | 10Gbit/s | " | " | " | " | | | | | | |
| | " | " | " | " | High Spec | 4CPU | 16GB | 10Gbit/s | " | " | " | " | | | | | | |
| 1500 | Low Spec | 2CPU | 8GB | 1Gbit/s | Low Spec | 2CPU | 8GB | 1Gbit/s | CPU Rich | 4CPU | 8GB | 1Gbit/s | | | | | | |
| | " | " | " | " | " | " | " | " | MEM Rich | 2CPU | 16GB | 1Gbit/s | | | | | | |
| | " | " | " | " | " | " | " | " | NET Rich | 2CPU | 8GB | 10Gbit/s | | | | | | |
| | " | " | " | " | " | " | " | " | High Spec | 4CPU | 16GB | 10Gbit/s | | 8CPU | 32GB | 1Gbit/s x2 10Gbit/s x1 | 45usec | |
| | … | … | … | … | … | … | … | … | … | … | … | … | | … | … | … | … | |

| | | VM GROUP 1 | | | | | | | | | | | | | | | | |
|---|---|---|---|---|---|---|---|---|---|---|---|---|---|---|---|---|---|---|
| | | VIRTUAL MACHINE A | | | | VIRTUAL MACHINE B | | | | VIRTUAL MACHINE C | | | | TOTAL HARDWARE RESOURCE | | | SERVICE PERFOR- MANCE | OBJECTIVE SERVICE PERFORMANCE |
| | | VM TYPE | CPU | MEM | NET | VM TYPE | CPU | MEM | NET | VM TYPE | CPU | MEM | NET | CPU | MEM | NET | | |
| 1100 | | Low Spec | 2CPU | 8GB | 1Gbit/s | Low Spec | 2CPU | 8GB | 1Gbit/s | Low Spec | 2CPU | 8GB | 1Gbit/s | 6CPU | 24GB | 1Gbit/s x3 | 48usec | |
| 1300 | | CPU Rich | 4CPU | 8GB | 1Gbit/s | " | " | " | " | " | " | " | " | 8CPU | 24GB | 1Gbit/s x3 | 48usec | |
| 1301 | | MEM Rich | 2CPU | 16GB | 1Gbit/s | " | " | " | " | " | " | " | " | 6CPU | 32GB | 1Gbit/s x3 | 46usec | |
| 1302 | | NET Rich | 2CPU | 8GB | 10Gbit/s | " | " | " | " | " | " | " | " | 6CPU | 24GB | 1Gbit/s x2 10Gbit/s x1 | 45usec | |
| 1200 | | High Spec | 4CPU | 16GB | 10Gbit/s | " | " | " | " | " | " | " | " | 8CPU | 32GB | 1Gbit/s x2 10Gbit/s x1 | 38usec | 40usec |
| 1400 | | Low Spec | 2CPU | 8GB | 1Gbit/s | Low Spec | 2CPU | 8GB | 1Gbit/s | " | " | " | " | 6CPU | 24GB | 1Gbit/s x3 | 48usec | |
| 1600 | | " | " | " | " | CPU Rich | 4CPU | 8GB | 1Gbit/s | | | | | | NONE | | | |
| 1601 | | " | " | " | " | MEM Rich | 2CPU | 16GB | 1Gbit/s | | | | | | NONE | | | |
| 1602 | | " | " | " | " | NET Rich | 2CPU | 8GB | 10Gbit/s | | | | | | | | | |
| 1500 | | " | " | " | " | High Spec | 4CPU | 16GB | 10Gbit/s | Low Spec | 2CPU | 8GB | 1Gbit/s | 8CPU | 32GB | 1Gbit/s x2 10Gbit/s x1 | 45usec | |
| | | " | " | " | " | " | " | " | " | CPU Rich | 4CPU | 8GB | 1Gbit/s | | | | | |
| | | " | " | " | " | " | " | " | " | MEM Rich | 2CPU | 16GB | 1Gbit/s | | | | | |
| | | " | " | " | " | " | " | " | " | NET Rich | 2CPU | 8GB | 10Gbit/s | | | | | |
| | | " | " | " | " | " | " | " | " | High Spec | 4CPU | 16GB | 10Gbit/s | | | | | |
| | | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | |

VM GROUP 1

| | VIRTUAL MACHINE A | | | | VIRTUAL MACHINE B | | | | VIRTUAL MACHINE C | | | | TOTAL HARDWARE RESOURCE | | | SERVICE PERFOR-MANCE | OBJECTIVE SERVICE PERFORMANCE |
|---|---|---|---|---|---|---|---|---|---|---|---|---|---|---|---|---|---|
| | VM TYPE | CPU | MEM | NET | VM TYPE | CPU | MEM | NET | VM TYPE | CPU | MEM | NET | CPU | MEM | NET | | |
| 1100 | Low Spec | 2CPU | 8GB | 1Gbit/s | Low Spec | 2CPU | 8GB | 1Gbit/s | Low Spec | 2CPU | 8GB | 1Gbit/s | 6CPU | 24GB | 1Gbit/s x3 | 48usec | |
| 1300 | CPU Rich | 4CPU | 8GB | 1Gbit/s | " | " | " | " | " | " | " | " | 8CPU | 24GB | 1Gbit/s x3 | 48usec | |
| 1301 | MEM Rich | 2CPU | 16GB | 1Gbit/s | " | " | " | " | " | " | " | " | 6CPU | 32GB | 1Gbit/s x3 | 46usec | |
| 1302 | NET Rich | 2CPU | 8GB | 10Gbit/s | " | " | " | " | " | " | " | " | 6CPU | 24GB | 1Gbit/s x2 10Gbit/s x1 | 45usec | |
| 1200 | High Spec | 4CPU | 16GB | 10Gbit/s | " | " | " | " | " | " | " | " | 8CPU | 32GB | 1Gbit/s x2 10Gbit/s x1 | 38usec | |
| 1400 | Low Spec | 2CPU | 8GB | 1Gbit/s | Low Spec | 2CPU | 8GB | 1Gbit/s | | | | | 6CPU | 24GB | 1Gbit/s x3 | 48usec | |
| 1600 | " | " | " | " | CPU Rich | 4CPU | 8GB | 1Gbit/s | | | | | | | NONE | | |
| 1601 | " | " | " | " | MEM Rich | 2CPU | 16GB | 1Gbit/s | | | | | | | NONE | | |
| 1602 | " | " | " | " | NET Rich | 2CPU | 8GB | 10Gbit/s | | | | | | | NONE | | |
| 1500 | " | " | " | " | High Spec | 4CPU | 16GB | 10Gbit/s | | | | | 8CPU | 32GB | 1Gbit/s x2 10Gbit/s x1 | 45usec | 40usec |
| | Low Spec | 2CPU | 8GB | 1Gbit/s | Low Spec | 2CPU | 8GB | 1Gbit/s | CPU Rich | 4CPU | 8GB | 1Gbit/s | | | 1Gbit/s x3 | 48usec | |
| | " | " | " | " | " | " | " | " | MEM Rich | 2CPU | 16GB | 1Gbit/s | | | 1Gbit/s x3 | 46usec | |
| | " | " | " | " | " | " | " | " | NET Rich | 2CPU | 8GB | 10Gbit/s | | | 1Gbit/s x2 10Gbit/s x1 | 45usec | |
| 1700 | " | " | " | " | " | " | " | " | High Spec | 4CPU | 16GB | 10Gbit/s | | | 1Gbit/s x2 10Gbit/s x1 | 38usec | |
| | " | " | " | " | " | " | " | " | " | " | " | " | | | | 36usec | |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | |

| VM GROUP 2 | | | | | | | | | | | | | | |
|---|---|---|---|---|---|---|---|---|---|---|---|---|---|---|
| VIRTUAL MACHINE D | | | | VIRTUAL MACHINE E | | | | TOTAL HARDWARE RESOURCE | | | SERVICE PERFORMANCE | OBJECTIVE SERVICE PERFORMANCE |
| VM TYPE | CPU | MEM | NET | VM TYPE | CPU | MEM | NET | CPU | MEM | NET | | |
| Low Spec | 2CPU | 8GB | 1Gbit/s | Low Spec | 2CPU | 8GB | 1Gbit/s | | | | | 100ops |
| CPU Rich | 4CPU | 8GB | 1Gbit/s | 〃 | 〃 | 〃 | 〃 | | | | | |
| MEM Rich | 2CPU | 16GB | 1Gbit/s | 〃 | 〃 | 〃 | 〃 | | | | | |
| NET Rich | 2CPU | 8GB | 10Gbit/s | 〃 | 〃 | 〃 | 〃 | | | | | |
| High Spec | 4CPU | 16GB | 10Gbit/s | 〃 | 〃 | 〃 | 〃 | | | | | |
| Low Spec | 2CPU | 8GB | 1Gbit/s | CPU Rich | 4CPU | 8GB | 1Gbit/s | | | | | |
| 〃 | 〃 | 〃 | 〃 | MEM Rich | 2CPU | 16GB | 1Gbit/s | | | | | |
| 〃 | 〃 | 〃 | 〃 | NET Rich | 2CPU | 8GB | 10Gbit/s | | | | | |
| 〃 | 〃 | 〃 | 〃 | High Spec | 4CPU | 16GB | 10Gbit/s | | | | | |
| ⋮ | ⋮ | ⋮ | ⋮ | ⋮ | ⋮ | ⋮ | ⋮ | ⋮ | ⋮ | ⋮ | ⋮ | |

FIG. 24

| VM GROUP 2 ||||||||||||||
| VIRTUAL MACHINE D |||| VIRTUAL MACHINE E |||| TOTAL HARDWARE RESOURCE ||| SERVICE PERFORMANCE | OBJECTIVE SERVICE PERFORMANCE |
| VM TYPE | CPU | MEM | NET | VM TYPE | CPU | MEM | NET | CPU | MEM | NET | | |
| Low Spec | 2CPU | 8GB | 1Gbit/s | Low Spec | 2CPU | 8GB | 1Gbit/s | 4CPU | 16GB | 1Gbit/s x2 | 90ops | 100ops |
| CPU Rich | 4CPU | 8GB | 1Gbit/s | 〃 | 〃 | 〃 | 〃 | | | | | |
| MEM Rich | 2CPU | 16GB | 1Gbit/s | 〃 | 〃 | 〃 | 〃 | | | | | |
| NET Rich | 2CPU | 8GB | 10Gbit/s | 〃 | 〃 | 〃 | 〃 | | | | | |
| High Spec | 4CPU | 16GB | 10Gbit/s | 〃 | 〃 | 〃 | 〃 | | | | | |
| 〃 | 〃 | 〃 | 〃 | Low Spec | 2CPU | 8GB | 1Gbit/s | | | | | |
| 〃 | 〃 | 〃 | 〃 | CPU Rich | 4CPU | 8GB | 1Gbit/s | | | | | |
| 〃 | 〃 | 〃 | 〃 | MEM Rich | 2CPU | 16GB | 1Gbit/s | | | | | |
| 〃 | 〃 | 〃 | 〃 | NET Rich | 2CPU | 8GB | 10Gbit/s | | | | | |
| 〃 | 〃 | 〃 | 〃 | High Spec | 4CPU | 16GB | 10Gbit/s | | | | | |
| ⋮ | ⋮ | ⋮ | ⋮ | ⋮ | ⋮ | ⋮ | ⋮ | ⋮ | ⋮ | ⋮ | ⋮ | |

FIG. 25

| VM GROUP 2 | | | | | | | | | | | | |
|---|---|---|---|---|---|---|---|---|---|---|---|---|
| VIRTUAL MACHINE D | | | | VIRTUAL MACHINE E | | | | TOTAL HARDWARE RESOURCE | | | SERVICE PERFORMANCE | OBJECTIVE SERVICE PERFORMANCE |
| VM TYPE | CPU | MEM | NET | VM TYPE | CPU | MEM | NET | CPU | MEM | NET | | |
| Low Spec | 2CPU | 8GB | 1Gbit/s | Low Spec | 2CPU | 8GB | 1Gbit/s | 4CPU | 16GB | 1Gbit/s x2 | 90ops | 100ops |
| CPU Rich | 4CPU | 8GB | 1Gbit/s | 〃 | 〃 | 〃 | 〃 | | | | | |
| MEM Rich | 2CPU | 16GB | 1Gbit/s | 〃 | 〃 | 〃 | 〃 | | | | | |
| NET Rich | 2CPU | 8GB | 10Gbit/s | 〃 | 〃 | 〃 | 〃 | | | | | |
| High Spec | 4CPU | 16GB | 10Gbit/s | Low Spec | 2CPU | 8GB | 1Gbit/s | 6CPU | 24GB | 1Gbit/s x1 10Gbit/s x1 | 104ops | |
| Low Spec | 2CPU | 8GB | 1Gbit/s | CPU Rich | 4CPU | 8GB | 1Gbit/s | | | | | |
| 〃 | 〃 | 〃 | 〃 | MEM Rich | 2CPU | 16GB | 1Gbit/s | | | | | |
| 〃 | 〃 | 〃 | 〃 | NET Rich | 2CPU | 8GB | 10Gbit/s | | | | | |
| 〃 | 〃 | 〃 | 〃 | High Spec | 4CPU | 16GB | 10Gbit/s | | | | | |
| ⋮ | ⋮ | ⋮ | ⋮ | ⋮ | ⋮ | ⋮ | ⋮ | ⋮ | ⋮ | ⋮ | ⋮ | |

FIG. 26

| | VIRTUAL MACHINE D | | | | VIRTUAL MACHINE E | | | | TOTAL HARDWARE RESOURCE | | | SERVICE PERFORMANCE | OBJECTIVE SERVICE PERFORMANCE |
|---|---|---|---|---|---|---|---|---|---|---|---|---|---|
| | VM TYPE | CPU | MEM | NET | VM TYPE | CPU | MEM | NET | CPU | MEM | NET | | |
| 2400 | Low Spec | 2CPU | 8GB | 1Gbit/s | Low Spec | 2CPU | 8GB | 1Gbit/s | 4CPU | 16GB | 1Gbit/s x2 | 90ops | 100ops |
| 2600 | CPU Rich | 4CPU | 8GB | 1Gbit/s | " | " | " | " | 6CPU | 16GB | 1Gbit/s x2 | 90ops | |
| 2601 | MEM Rich | 2CPU | 16GB | 1Gbit/s | " | " | " | " | 4CPU | 24GB | 1Gbit/s x2 | 96ops | |
| 2602 | NET Rich | 2CPU | 8GB | 10Gbit/s | " | " | " | " | 4CPU | 16GB | 1Gbit/s x1 10Gbit/s x1 | 94ops | |
| 2500 | High Spec | 4CPU | 16GB | 10Gbit/s | Low Spec | 2CPU | 8GB | 1Gbit/s | 6CPU | 24GB | 1Gbit/s x1 10Gbit/s x1 | 104ops | |
| | " | " | " | " | CPU Rich | 4CPU | 8GB | 1Gbit/s | | | | | |
| | " | " | " | " | MEM Rich | 2CPU | 16GB | 1Gbit/s | | | | | |
| | " | " | " | " | NET Rich | 2CPU | 8GB | 10Gbit/s | | | | | |
| | " | " | " | " | High Spec | 4CPU | 16GB | 10Gbit/s | | | | | |
| | ⋮ | ⋮ | ⋮ | ⋮ | ⋮ | ⋮ | ⋮ | ⋮ | ⋮ | ⋮ | ⋮ | ⋮ | |

700

VM GROUP 2

FIG. 27

| | VM GROUP 2 | | | | | | | | | | | |
|---|---|---|---|---|---|---|---|---|---|---|---|---|
| | VIRTUAL MACHINE D | | | | VIRTUAL MACHINE E | | | | TOTAL HARDWARE RESOURCE | | | |
| VM TYPE | CPU | MEM | NET | VM TYPE | CPU | MEM | NET | CPU | MEM | NET | SERVICE PERFORMANCE | OBJECTIVE SERVICE PERFORMANCE |
| Low Spec | 2CPU | 8GB | 1Gbit/s | Low Spec | 2CPU | 8GB | 1Gbit/s | 4CPU | 16GB | 1Gbit/s x2 | 90ops | |
| CPU Rich | 4CPU | 8GB | 1Gbit/s | ″ | ″ | ″ | ″ | 6CPU | 16GB | 1Gbit/s x2 | 90ops | |
| MEM Rich | 2CPU | 16GB | 1Gbit/s | ″ | ″ | ″ | ″ | 4CPU | 24GB | 1Gbit/s x2 | 96ops | |
| NET Rich | 2CPU | 8GB | 10Gbit/s | ″ | ″ | ″ | ″ | 4CPU | 16GB | 1Gbit/s x1 10Gbit/s x1 | 94ops | |
| High Spec | 4CPU | 16GB | 10Gbit/s | ″ | ″ | ″ | ″ | 6CPU | 24GB | 1Gbit/s x1 10Gbit/s x1 | 104ops | 100ops |
| Low Spec | 2CPU | 8GB | 1Gbit/s | Low Spec | 2CPU | 8GB | 1Gbit/s | 4CPU | 16GB | 1Gbit/s x2 | 90ops | |
| ″ | ″ | ″ | ″ | CPU Rich | 4CPU | 8GB | 1Gbit/s | 6CPU | 16GB | 1Gbit/s x2 | 90ops | |
| ″ | ″ | ″ | ″ | MEM Rich | 2CPU | 16GB | 1Gbit/s | 4CPU | 24GB | 1Gbit/s x2 | 96ops | |
| ″ | ″ | ″ | ″ | NET Rich | 2CPU | 8GB | 10Gbit/s | 4CPU | 16GB | 1Gbit/s x1 10Gbit/s x1 | 103ops | |
| ″ | ″ | ″ | ″ | High Spec | 4CPU | 16GB | 10Gbit/s | 6CPU | 24GB | 1Gbit/s x1 10Gbit/s x1 | 110ops | |
| ... | ... | ... | ... | ... | ... | ... | ... | ... | ... | ... | ... | |

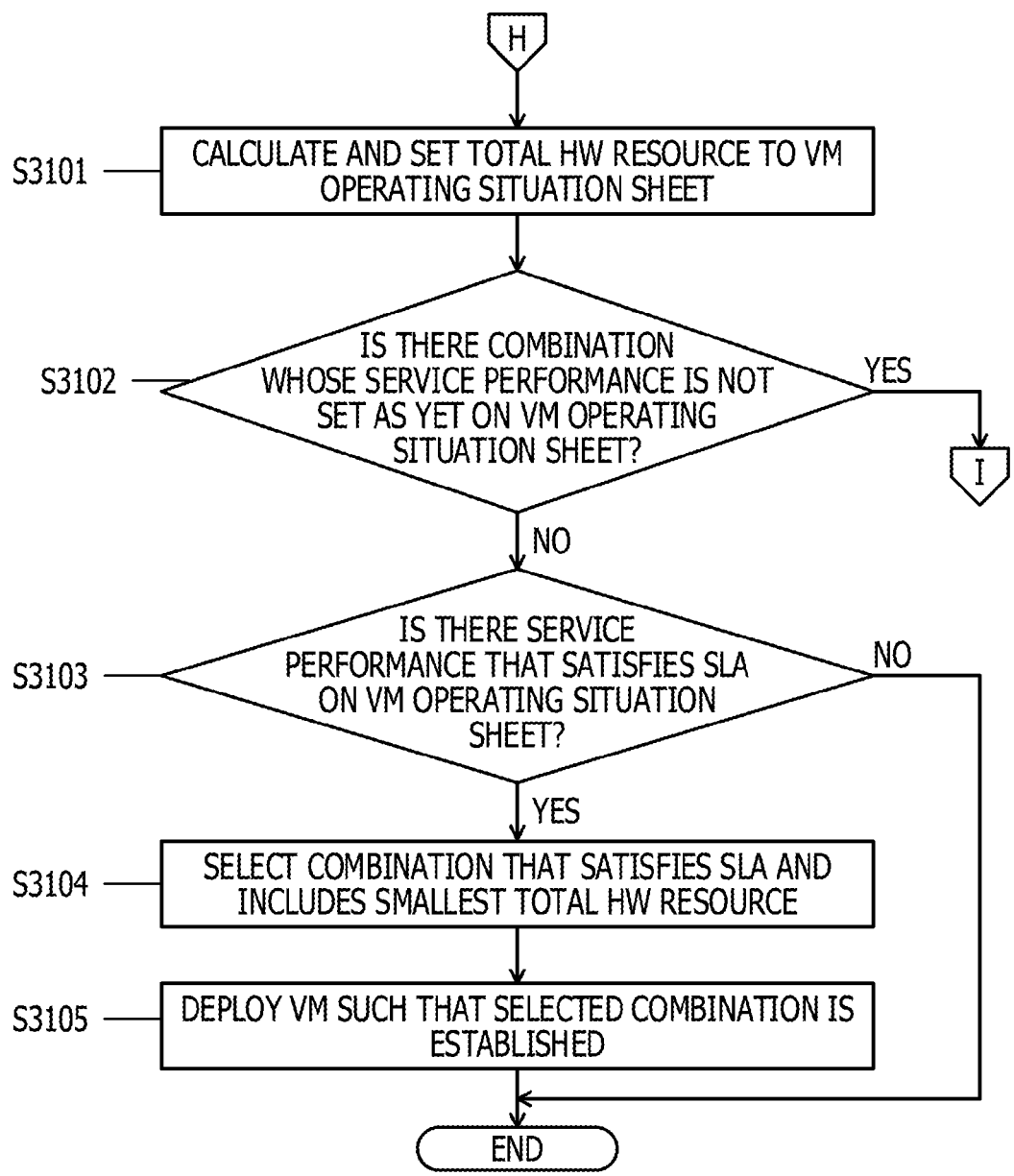

MANAGEMENT APPARATUS, CONTROL METHOD OF CALCULATION RESOURCES, AND STORAGE MEDIUM

CROSS-REFERENCE TO RELATED APPLICATION

This application is a continuation application of International Application PCT/JP2018/000123, filed on Jan. 5, 2018 and designated the U.S., the entire contents of which are incorporated herein by reference. The International Application PCT/JP2018/000123 is based upon and claims the benefit of priority of the prior Japanese Patent Application No. 2017-007695, filed on Jan. 19, 2017, the entire contents of which are incorporated herein by reference.

FIELD

The embodiment discussed herein relates to a management apparatus, a control method, and a storage medium.

BACKGROUND

A technology is conventionally available which manages calculation resources of information processing apparatus and so forth in a data center such that a service level agreement (SLA) that is a requirement level on service contents, service qualities and so forth contracted by a data center contractor to customers and autonomously controls such calculation resources to be allocated to virtual machines (VMs) by the data center.

As a prior art, for example, a technology is available by which, when the number of times by which the bidirectional communication amount between two virtual machines being executed by different physical machines exceeds a prescribed value, the two virtual machines are executed by a same physical machine. Further, a technology is available by which, for example, for each of one or more server apparatus in which a new virtual machine may be deployed, an index value indicative of an adequacy in deployment of a new virtual machine in the server apparatus is calculated and such calculated index values are referred to determine a deployment determination of the new virtual machine. Furthermore, a technology is available by which, on condition that a group condition regarding whether a plurality of virtual servers provided on a plurality of physical servers are to be provided in physical servers different from each other or on a same physical server is satisfied, redeployment of the virtual servers is performed. Examples of the related art include Laid-Open Patent Publication No. 2010-140134, International Publication Pamphlet No. WO2007/136021 and Japanese Laid-open Patent Publication No. 2009-199395.

However, according to the prior arts, it is difficult to minimize calculation resources, which are used in an information processing system that provides one service using a plurality of virtual machines, within a range within which the SLA of the service is satisfied. For example, even if it is tried to minimize calculation resources so as to satisfy the SLA paying attention to one by one virtual machine, it may not be possible to minimize calculation resources in the entire information processing system. Taking the foregoing into consideration, it is desirable to achieve minimization of calculation resources to be used in an information processing apparatus.

SUMMARY

According to an aspect of the embodiments, a management apparatus that manages an information processing system that includes a plurality of information processing apparatuses respectively including a plurality of calculation resources, the management apparatus includes a memory; and a processor coupled to the memory and configured to: store configuration information and performance information for each of the plurality of information processing apparatuses acquired from a host OS executed by each of a plurality of groups to which the plurality of information processing apparatuses belong and each of which provides a given service into the memory for each of the plurality of groups, select, based on the configuration information and the performance information stored for each of the plurality of groups in the memory, a movement target virtual machine that is a movement target from a target group to which a virtual machine of a selection target belongs to a different group for each of the plurality of groups, when the movement target virtual machine is moved to the different group, determine whether a performance value of a service corresponding to the movement target virtual machine satisfies a reference value, and when it is determined that the performance value satisfies the reference value, determine to move the movement target virtual machine from the target group to the different group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory view depicting an example of storage contents of a VM type table;

FIG. 7 is an explanatory view of an example of storage contents of a VM operating state sheet;

FIG. 10 is an explanatory view (part 1) depicting an operation example 1 of a management apparatus;

FIG. 11 is an explanatory view (part 2) depicting the operation example 1 of a management apparatus;

FIG. 12 is an explanatory view (part 3) depicting the operation example 1 of a management apparatus;

FIG. 13 is an explanatory view (part 4) depicting the operation example 1 of a management apparatus;

FIG. 14 is an explanatory view (part 5) depicting the operation example 1 of a management apparatus;

FIG. 15 is an explanatory view (part 6) depicting the operation example 1 of a management apparatus;

FIG. 16 is an explanatory view (part 7) depicting the operation example 1 of a management apparatus;

FIG. 17 is an explanatory view (part 8) depicting the operation example 1 of a management apparatus;

FIG. 23 is an explanatory view (part 1) depicting an operation example 2 of a management apparatus;

FIG. 24 is an explanatory view (part 2) depicting the operation example 2 of a management apparatus;

FIG. 25 is an explanatory view (part 3) depicting the operation example 2 of a management apparatus;

FIG. 26 is an explanatory view (part 4) depicting the operation example 2 of a management apparatus;

FIG. 27 is an explanatory view (part 5) depicting the operation example 2 of a management apparatus;

FIG. 31 is a flow chart (part 4) depicting the example of a management processing procedure in a working example 2.

DESCRIPTION OF EMBODIMENTS

In the following, an embodiment of a management apparatus, a control method and a management program according to the present disclosure is described in detail with reference to the drawings.

Figure 1:
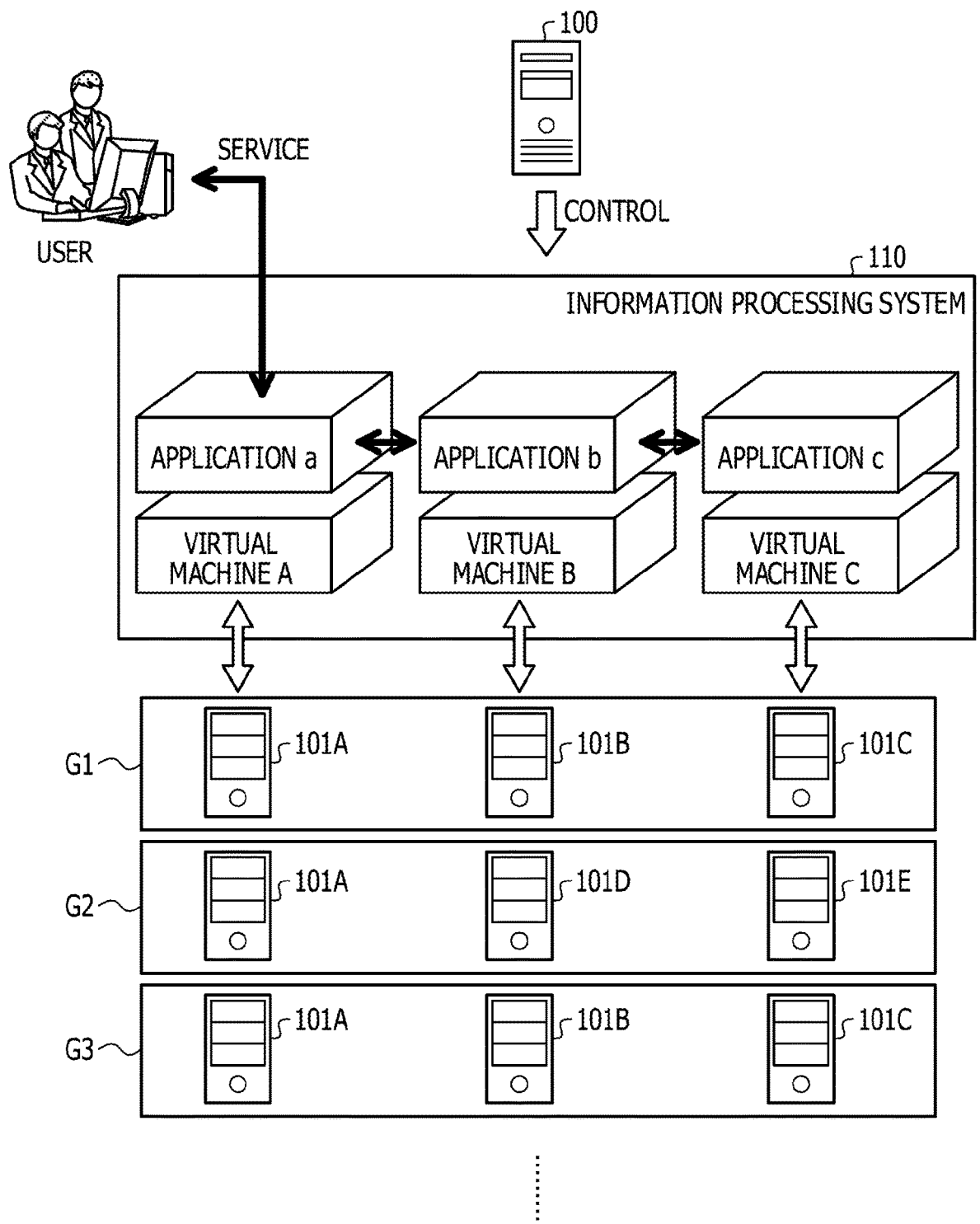
FIG. 1 is an explanatory view depicting a working example of a control method for an information processing system according to an embodiment.

Working Example of Control Method of Information Processing System 110 According to Embodiment FIG. 1 is an explanatory view depicting a working example of a control method for an information processing system 110 according to the embodiment. The management apparatus 100 is a computer that manages an information processing system 110 that includes a plurality of information processing apparatus 101. Each information processing apparatus 101 is a computer that includes a plurality of calculation resources and may execute virtual machines. The information processing apparatus 101 is, for example, a server in a data center.

The calculation resources are, for example, hardware resources. The hardware resources are, for example, a central processing unit (CPU) resource or the like of a server. The CPU resource is represented, for example, by the number of CPUs deployed to a virtual machine, the number of cores in each CPU, the number of virtual CPUs or the like. The hardware resource may be, for example, the storage capacity of the server, a network bandwidth or the like.

In the following description, a virtual machine is sometimes represented as "VM." Further, in the following description, a hardware resource is sometimes represented as "hardware (HW) resource."

In a service in which a data center is utilized, there is a tendency that it is demanded to satisfy a SLA contracted between a provider of the service and a user of the service such that the usability desired by the user of the service is assured. Further, also there is a tendency that, in order to reduce the power consumption of the data center or increase the number of services that may be provided by the data center or the like, it is demanded to minimize the HW resource to be used in the services. In this manner, in a service in which a data center is used, it is preferable to reduce the HW resource to be used in the service while the SLA is satisfied.

In contrast, it is conceivable to adjust, for each of VMs that are executed by a server in a data center and used by a user, the HW resource to be used deployed to the VM within a range within which the SLA is satisfied to minimize the HW resource to be deployed to the VM. However, even if it is tried to minimize the HW resource within a range within which the SLA is satisfied for each VM, it is sometimes difficult to minimize the HW resource to be used in the service in the overall data center.

For example, there is a tendency that, in the case where one service is provided using a plurality of VMs, if the HW resource to be deployed to a certain VM is increased or decreased, then this has an influence also on operation of the other VMs and also the number of HW resources that are to be deployed to the other VMs in the minimum varies. For example, in the case where a certain VM is a bottleneck to the SLA, even if it is tried to decrease the HW resource to be deployed to the other VMs while the HW resource to be deployed to the VM remains fixed without adjusting the same, it is difficult to minimize HW resources to be deployed to the other VMs.

Therefore, the present embodiment described below is directed to a control method by which HW resources to be deployed to a plurality of VMs that provide a service and performance information are mapped to achieve minimization of calculation resources to be used in the overall information processing system 110 that provides the service.

Referring to FIG. 1, there are a VM A in which an application a operates, a VM B in which another application b operates, and a VM C in which a further application c operates. Further, there are a plurality of groups to each of which a plurality of information processing apparatus 101 belong and which provide given services by the applications a to c.

In the example of FIG. 1, there are groups G1 to G3. The group G1 is a group to which, for example, an information processing apparatus 101A that executes a VM A, another information processing apparatus 101B that executes a VM B and a further information processing apparatus 101C that executes a VM C belong. The group G2 is a group to which, for example, the information processing apparatus 101A that executes the VM A, another information processing apparatus 101D that executes a VM B and a further information processing apparatus 101E that executes a VM C belong. The same information processing apparatus 101 may belong to different groups like the groups G1 and G2.

The group G3 is a group to which, for example, the information processing apparatus 101A that executes the VM A, the information processing apparatus 101B that executes the VM B and the information processing apparatus 101C that executes the VM C belong. In the group G3, the information processing apparatus 101A deploys a HW resource different from a HW resource in the case where it is deployed in the group G1 to the VM A. If HW resources that are deployed to VMs in different groups are different in magnitude as in the groups G1 and G3, then the information processing apparatus 101 that belong to different groups may be of a same combination.

The management apparatus 100 acquires configuration information and performance information of each information processing apparatus 101 from a host operating system (OS) executed by each of a plurality of groups and stores the acquired information into a storage unit for each of the plurality of groups. The configuration information is, for example, a CPU number, a storage capacity, a network bandwidth and so forth. The performance information is, for example, a performance value indicative of a state of the latency, throughput or the like of the information processing apparatus 101. The performance information is determined, for example, by execution of a benchmark.

The management apparatus 100 acquires configuration information indicative of a CPU number, a storage capacity, a network bandwidth and so forth used, for example, in the VMs A to C in the information processing apparatus 101 belonging to the groups. The management apparatus 100 causes, for example, the individual groups to execute the VMs A to C and acquires, from a performance monitor on the host OS executed by each of the information processing apparatus 101 belonging to the groups, performance information indicative of the latency, throughput and so forth of the information processing apparatus 101.

Consequently, the management apparatus 100 may map, for each of the groups, the magnitude of HW resources used in the VMs A to C in each information processing apparatus 101 belonging to the group and the performance information of a service provided by the group. Therefore, the management apparatus 100 may investigate minimization of HW resources taking a greater number of variations in which HW resources are deployed to the VMs into consideration in comparison with that in an alternative case in which it is tried to minimize HW resources so as to satisfy the SLA taking notice of one by one VM.

The management apparatus 100 selects a movement target VM, which becomes a movement target from a target block to which a VM of a selection target belongs to a different group, for each of a plurality of groups based on the configuration information and the performance information stored for each of the plurality of groups in the storage unit. The VM of the selection target is a plurality of VMs that provide a service. The target group is a group to which an information processing apparatus 101 in which a VM of a selection target is currently executed. For example, in the case where, for each group, the VMs A to C are to be deployed to the information processing apparatus 101 that belong to the group, the management apparatus 100 selects a VM to which the deployment of HW resources is to be changed.

In the case where the management apparatus 100 has moved a movement target VM to a different group, the management apparatus 100 decides whether or not the performance value of a service corresponding to the movement target VM satisfies a reference value determined in advance. The service corresponding to the VM of the movement target is a service that is executed by the information processing apparatus 101 that belong to the target group and is provided by a plurality of VMs, and is a service same as a service provided by a plurality of VMs having been executed by the information processing apparatus 101 that belong to the target group. The performance value is, for example, a latency or a throughput. The management apparatus 100 calculates the performance value of a service provided by the VMs A to C based on the performance information of the information processing apparatus 101 that belong to a different group and decides whether or not the performance value satisfies its SLA.

When the management apparatus 100 decides that the performance value satisfies the reference value, it determines movement of the movement target VM from the target group to the different group. The management apparatus 100 deploys, for example, the VMs A to C to the information processing apparatus 101 that belong to the different group. Consequently, the management apparatus 100 may specify a group in which there is the possibility that the HW resource used for the service may be small within a range within which the SLA is satisfied from among the target groups. Then, the management apparatus 100 moves the VMs A to C to the different group that satisfies the SLA and may thereby achieve minimization of HW resources.

Although the case is described here in which the groups belong to the individual information processing apparatus 101 and the information processing apparatus 101 indicate variations of HW resources that may be deployed to a plurality of VMs by the individual information processing apparatus 101, this is not restrictive. For example, the groups may indicate variations in which a VM type is set to each VM and each information processing apparatus 101 deploys a HW resource corresponding to the VM type set to each VM. This makes it possible for the management apparatus 100 to reduce the number of variations to be considered thereby to achieve reduction of the burden imposed thereon when it investigates minimization of HW resources.

Although a case in which a group exists in advance is described here, this is not restrictive. For example, the management apparatus 100 may create a group. Alternatively, the manager of the information processing system 110 may input a group to the management apparatus 100.

Example of Information Processing System 110

Now, an example of the information processing system 110 to which the management apparatus 100 depicted in FIG. 1 is applied is described with reference to FIG. 2.

Figure 2:
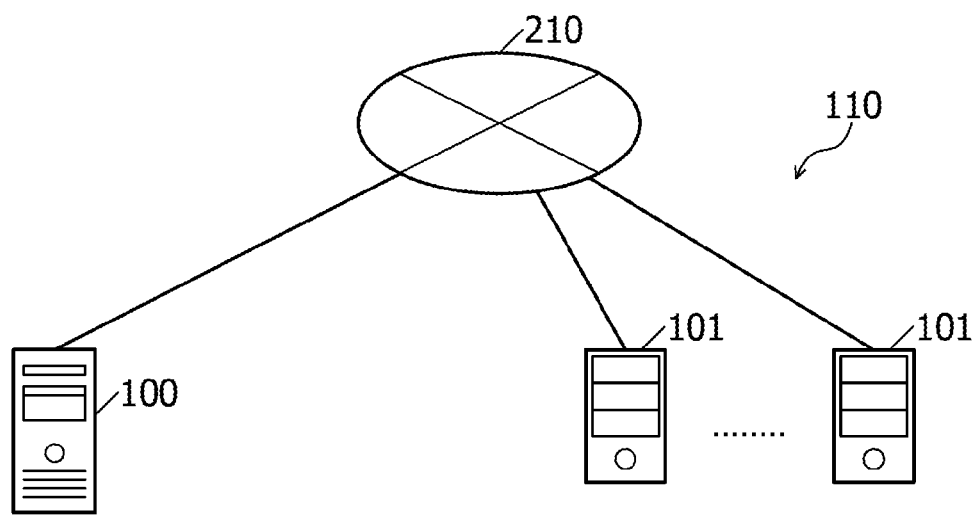
FIG. 2 is an explanatory view depicting an example of an information processing system.

FIG. 2 is an explanatory view depicting an example of an information processing system 110. The information processing system 110 includes a management apparatus 100 and information processing apparatus 101. In the information processing system 110, the management apparatus 100 and the information processing apparatus 101 are coupled to each other through a wired or wireless network 210. The network 210 is, for example, a local area network (LAN), a wide area network (WAN), the Internet or the like.

The management apparatus 100 is a computer that manages the information processing apparatus 101. The management apparatus 100 particularly is a sever. The management apparatus 100 is a server in a data center. The management apparatus 100 may otherwise be a server outside the data center. Each information processing apparatus 101 is a computer including a calculation resource. The information processing apparatus 101 may execute a VM. The information processing apparatus 101 executes a VM, for example, by a host OS. The information processing apparatus 101 may execute a VM otherwise, for example, by a hypervisor. The information processing apparatus 101 particularly is a server. The management apparatus 100 may be integrated with some information processing apparatus 101.

Example of Usage of Information Processing System 110

Now, an example of usage of the information processing system 110 is described with reference to FIG. 3.

Figure 3:
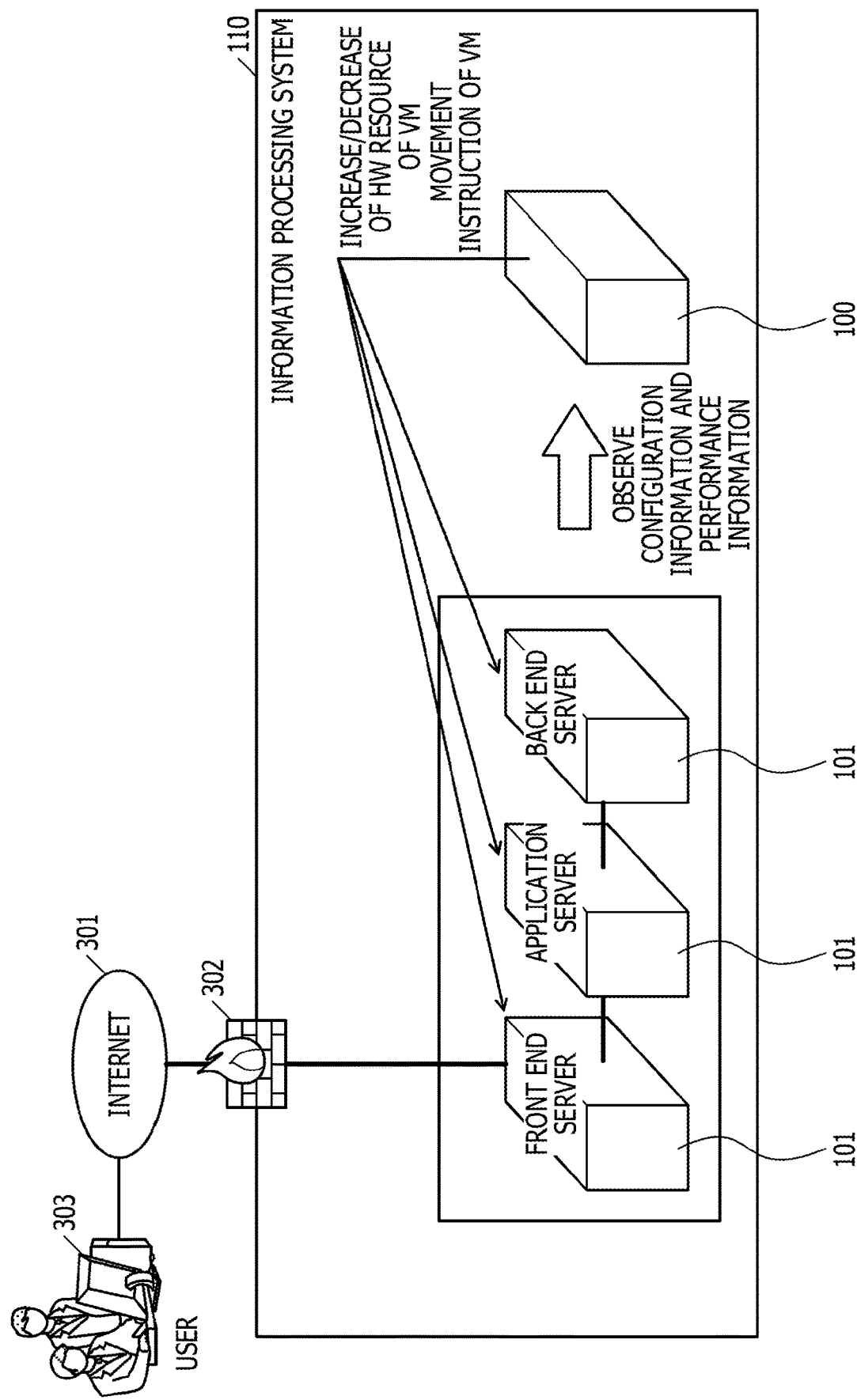
FIG. 3 is an explanatory view depicting an example of usage of an information processing system.

FIG. 3 is an explanatory view depicting an example of usage of an information processing system 110. Referring to FIG. 3, the information processing system 110 provides a service to a user through a client apparatus 303 by cooperation of a VM for implementing functions of a front end server, another VM for implementing functions of an application server and a further VM for implementing functions of a back end server.

The information processing system 110 deploys the VM for implementing functions of a front end server to one of the information processing apparatus 101 to implement a front end server. The front end server is a server that communicates, for example, with the client apparatus 303 through the Internet 301 and a firewall 302. The information processing system 110 deploys the VM for implementing functions of an application server to one of the information processing apparatus 101 to implement an application server. The Application server is a server that performs a given process, for example, in response to communication contents from the client apparatus 303. The information processing system 110 deploys the VM for implementing functions of a backend server to one of the information processing apparatus 101 to implement a backend server. The backend server is a server that manages, for example, a data base (DB) and so forth.

The management apparatus 100 controls the HW resource to be deployed to a VM by each information processing apparatus 101 or controls deployment of a VM in a plurality of information processing apparatus 101. The management apparatus 100 controls HW resources to VMs or controls deployment of VMs in a plurality of information processing apparatus 101 and acquires information of the HW resources deployed to the VMs by the individual information processing apparatus 101 and performance information of services. The management apparatus 100 controls the HW resource to be applied to VMs by the individual information processing apparatus 101 within a range within which the SLA is satisfied or controls deployment of VMs in the plurality of information processing apparatus 101 based on the acquired information of the HW resources and the performance information of the services.

Example of Hardware Configuration of Management Apparatus 100

Now, an example of a hardware configuration of the management apparatus 100 is described with reference to FIG. 4.

Figure 4:
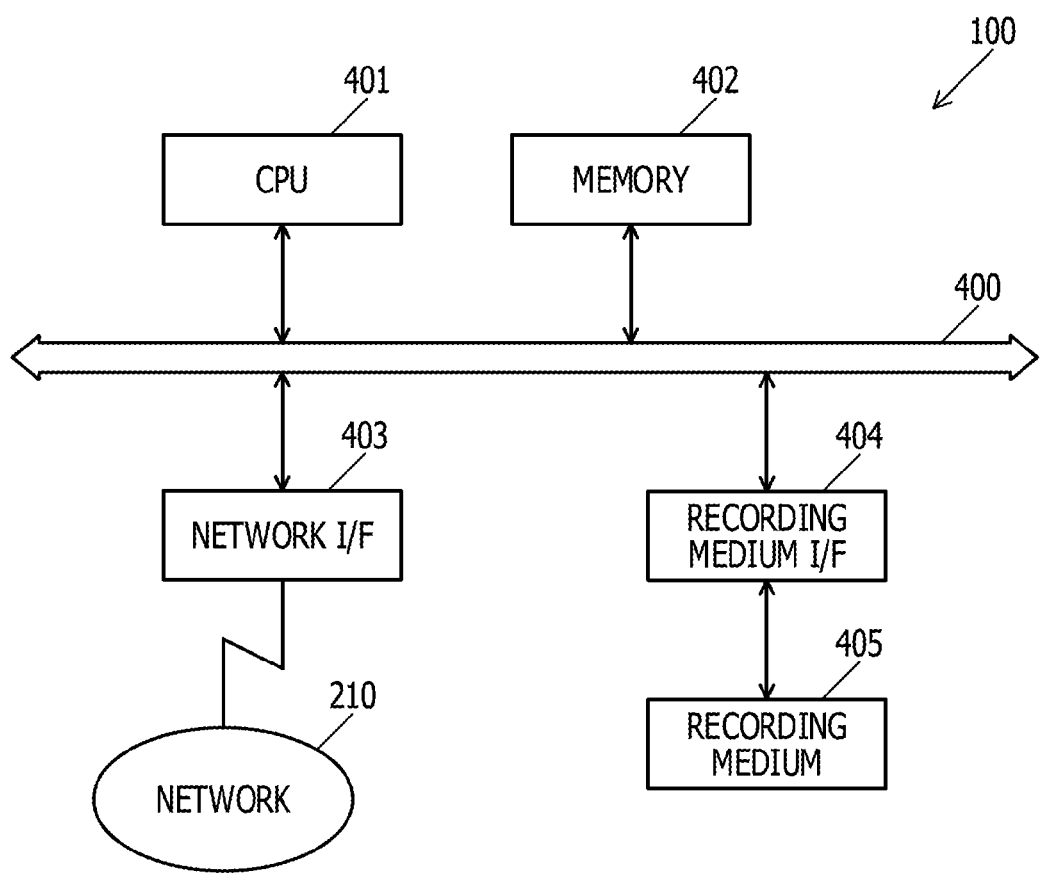
FIG. 4 is a block diagram depicting an example of a hardware configuration of a management apparatus.

FIG. 4 is a block diagram depicting an example of a hardware configuration of the management apparatus 100. Referring to FIG. 4, the management apparatus 100 includes a CPU 401, a memory 402, a network interface (I/F) 403, a recording medium I/F 404, and a recording medium 405. The components mentioned are coupled to each other by a bus 400.

Here, the CPU 401 controls the overall management apparatus 100. The memory 402 includes, for example, a read only memory (ROM), a random access memory (RAM), a flash ROM and so forth. For example, for example, the flash ROM or the ROM includes various programs stored therein, and the RAM is used as a work area of the CPU 401. A program stored in the memory 402 is loaded into the CPU 401 such that the CPU 401 executes processes coded in the program.

The network I/F 403 is coupled to the network 210 through a communication line and is coupled to a different computer through the network 210. The network I/F 403 controls interfacing between the network 210 and the inside of the management apparatus 100 and controls inputting and outputting of data from and to a different computer. For the network I/F 403, for example, a modem, a LAN adapter or the like may be adopted.

The recording medium I/F 404 controls read/write of data from/into the recording medium 405 under the control of the CPU 401. The recording medium I/F 404 is, for example, a disk drive, a solid state drive (SSD), a universal serial bus (USB) port or the like. The recording medium 405 is a nonvolatile memory that stores data written therein under the control of the recording medium I/F 404. The recording medium 405 is, for example, a disk, a semiconductor memory, a USB memory or the like. The recording medium 405 may be removable from the management apparatus 100.

The management apparatus 100 may include, for example, a keyboard, a mouse, a display and so forth in addition to the components described above. Otherwise, the management apparatus 100 may not include the recording medium I/F 404 or the recording medium 405. Since an example of a hardware configuration of the information processing apparatus 101 is similar to the example of the hardware configuration of the management apparatus 100, description of the same is omitted.

Storage Contents of Calculation Resource Management Table 500

Now, storage contents of a calculation resource management table 500 are described with reference to FIG. 5. The calculation resource management table 500 is implemented, for example, by a storage area of the memory 402 or the recording medium 405 of the management apparatus 100 depicted in FIG. 4 or the like.

Figure 5:
FIG. 5 is an explanatory view depicting an example of storage contents of a calculation resource management table.

FIG. 5 is an explanatory view depicting an example of storage contents of a calculation resource management table 500. As depicted in FIG. 5, the calculation resource management table 500 includes fields for physical host, CPU and memory (MEM). Into the calculation resource management table 500, calculation resource management information is stored as records by setting information to each field for each physical host.

To the field for physical host, an address of each information processing apparatus 101 that may execute the VM is set. To the field for CPU, the number of CPUs the information processing apparatus 101 includes is set. To the field for MEM, the size of the memory 402 the information processing apparatus 101 includes is set. Consequently, the calculation resource management table 500 makes it possible to decide what size of HW resource may be used in a VM deployed in the information processing apparatus 101.

Storage Contents of VM Type Table 600

Now, storage contents of a VM type table 600 are described with reference to FIG. 6. The VM type table 600 is implemented, for example, by a storage area of the memory 402, the recording medium 405 or the like of the management apparatus 100 depicted in FIG. 4.

FIG. 6 is an explanatory view depicting an example of storage contents of a VM type table 600. As depicted in FIG. 6, the VM type table 600 includes fields for VM type, CPU, MEM and network (NET). Into the VM type table 600, VM type information is stored as records by setting information to each field for each VM type.

To the field for VM type, a VM type corresponding to specifications required for each VM is set. To the field for CPU, a condition of a CPU to be deployed to the VM is set in order to implement the specifications. The condition of the CPU may be the number of CPUs. To the field for MEM, a condition of a size of the memory 402 to be deployed to the VM in order to implement the specifications is set. To the field for NET, a condition of a magnitude of a network bandwidth to be deployed to the VM in order to implement the specifications is set. Consequently, the VM type table 600 makes it possible to specify the magnitude of a HW resource to be used in a VM of a certain VM type.

Storage Contents of VM Operating Situation Sheet 700

Now, storage contents of a VM operating situation sheet 700 are described with reference to FIG. 7. The VM operating situation sheet 700 is implemented, for example, by a storage area of the memory 402, the recording medium 405 or the like of the management apparatus 100 depicted in FIG. 4.

FIG. 7 is an explanatory view depicting an example of storage contents of a VM operating situation sheet 700. As depicted in FIG. 7, the VM operating situation sheet 700 includes fields for one or more VMs, total HW resource, service performance and target service performance. Into the VM operating situation sheet 700, VM operating situation information is stored as records by setting information to each of the fields for each of variations to the HW resource to be applied to a plurality of VMs for implementing a service.

The field for VM is provided for each of VMs that implement a service. The field for VM further includes fields for VM type, CPU, MEM and NET. To the field for VM type, a VM type corresponding to specifications required for the VM is set. To the field for CPU, a condition of a CPU to be deployed to the VM in order to implement the specifications is set. To the field for MEM, a condition of a size of the memory 402 to be deployed to the VM in order to implement the specifications is set. To the field for NET, a condition of a magnitude of a network bandwidth to be deployed to the VM is set.

The field for total HW resource further includes fields for CPU, MEM and NET. To the field for CPU, a total value of numbers of CPUs to be used in the individual information processing apparatus 101 in order to execute a plurality of VMs for implementing the service is set. To the field for MEM, a total value of sizes of the memories 402 used in the individual information processing apparatus 101 in order to execute a plurality of VMs for implementing the service is set. To the field for NET, a total value of magnitudes of the network bandwidths used in the individual information processing apparatus 101 in order to execute a plurality of VMS for implementing the service is set. This makes it possible for the VM operating situation sheet 700 to take a greater number of variations in which HW resources are to be deployed to a plurality of VMs for providing a certain service into consideration. Particular examples of the VM operating situation sheet 700 are hereinafter described with reference to FIGS. 10 to 17 and FIGS. 23 to 27.

Example of Functional Configuration of Management Apparatus 100

Now, an example of a functional configuration of the management apparatus 100 is described with reference to FIG. 8.

Figure 8:
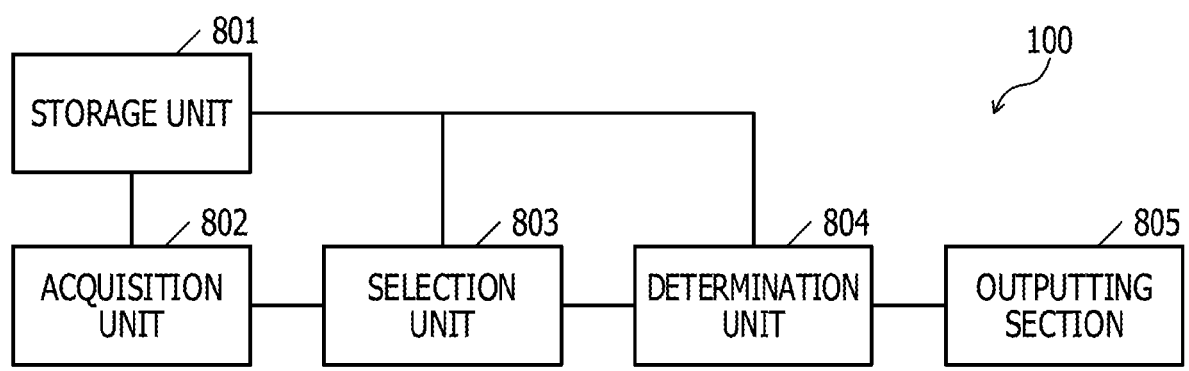
FIG. 8 is a block diagram depicting an example of a functional configuration of the management apparatus.

FIG. 8 is a block diagram depicting an example of a functional configuration of the management apparatus 100. As depicted in FIG. 8, the management apparatus 100 includes a storage unit 801, an acquisition unit 802, a selection unit 803, a determination unit 804 and an outputting unit 805.

The storage unit 801 is implemented, for example, by a storage area of the memory 402, the recording medium 405 depicted in FIG. 4 or the like. The components from the acquisition unit 802 to the outputting unit 805 are functions serving as a control unit. The components from the acquisition unit 802 to the outputting unit 805 implement the functions thereof particularly, for example, by causing the CPU 401 to execute a program stored in a storage area of the memory 402, recording medium 405 depicted in FIG. 3 or the like or by the network I/F 403. Results of processing by the functioning units are stored, for example, into a storage area of the memory 402, recording medium 405 or the like depicted in FIG. 3.

The storage unit 801 stores configuration information and performance information of the individual information processing apparatus 101 for each of a plurality of groups. Each information processing apparatus 101 includes a plurality of calculation resources and is provided in the information processing system 110. Each group includes a plurality of information processing apparatus 101 belonging thereto and provides a given service. The storage unit 801 is, for example, the VM operating situation sheet 700. The configuration information is, for example, a CPU number, a storage capacity, a network bandwidth or the like. The performance information is, for example, a performance value indicative of a state of the latency, throughput or the like of the information processing apparatus 101. The performance information is determined, for example, by execution of a benchmark. The calculation resources are HW resources.

Consequently, the storage unit 801 may store a comparatively great number of variations in which a HW resource is deployed to a plurality of VMs for providing a certain service. Therefore, the storage unit 801 may take a greater number of variations in which HW resources are deployed to the VMs into consideration in comparison with that in an alternative case in which it is tried to minimize HW resources so as to satisfy the SLA taking notice of one by one VM.

The acquisition unit 802 acquires configuration information and performance information of each information processing apparatus 101 from a host OS executed by each of a plurality of groups and stores the acquired information into the storage unit 801 for each of the plurality of groups. The acquisition unit 802 acquires configuration information indicative of, for example, a CPU number, a storage capacity, a network frequency bandwidth and so forth to be used in a plurality of VMs in each information processing apparatus 101 belonging to each group. The acquisition unit 802 causes, for example, each group to execute a plurality of VMs and acquires performance information indicative of a state of the latency, the throughput or the like of the information processing apparatus 101 from a performance monitor on the host OS executed by the information processing apparatus 101 belonging to the group.

Consequently, the acquisition unit 802 may map, for each group, the magnitude of a HW resource used in a plurality of VMs in each information processing apparatus 101 belonging to the group and performance information of a service provided by the group. Therefore, the acquisition unit 802 may specify which group satisfies the SLA and of which group the HW resource is comparatively small.

The acquisition unit 802 may decide whether or not performance information of a group whose performance information is not acquired as yet is to be acquired based on configuration and performance information acquired already. Then, the acquisition unit 802 may acquire performance information of the group from which it is determined to acquire performance information and store the performance information into the storage unit 801.

The acquisition unit 802 specifies one or more groups, for example, in the case where the HW resource to be deployed to a certain VM from among a plurality of VMs is made variable and the HW resource to be deployed to the other VMs is fixed. The acquisition unit 802 decides whether or not, in the case where the group is changed over from a group whose HW resource is smallest among the specified one or more groups to another group whose HW resource is greatest, the performance value becomes better by 10% or more. If the performance value does not become better, then the acquisition unit 802 omits acquisition of performance information from the remaining ones other than the specified one or more groups. This makes it possible for the acquisition unit 802 to reduce the period of time required when a VM is deployed to the information processing apparatus 101 and a benchmark is executed to acquire performance information and reduce the burden to be imposed on the management apparatus 100.

The acquisition unit 802 specifies one or more groups, for example, in the case where the HW resource to be deployed to a certain VM from among a plurality of VMs is made variable and the HW resource to be deployed to the other VMs is fixed. The acquisition unit 802 acquires performance information from the specified one or more groups in the ascending order of the size of the HW resource until the SLA is satisfied, and omits the acquisition of performance information regarding any group from which performance information is not acquired as yet at the point of time at which the SLA is satisfied. This makes it possible for the acquisition unit 802 to reduce the period of time required when a VM is deployed to the information processing apparatus 101 and a benchmark is executed to acquire performance information and reduce the burden to be imposed on the management apparatus 100.

The acquisition unit 802 specifies one or more groups, for example, in the case where the HW resource to be deployed to a certain VM from among a plurality of VMs is made variable and the HW resource to be deployed to the other VMs is fixed. The acquisition unit 802 acquires performance information from the specified one or more groups in the descending order of the size of the HW resource until the SLA is satisfied, and omits the acquisition of performance information regarding any group from which performance information is not acquired as yet at the point of time at which the SLA is not satisfied anymore. This makes it possible for the acquisition unit 802 to reduce the period of time required when a VM is deployed to the information processing apparatus 101 and a benchmark is executed to acquire performance information and reduce the burden to be imposed on the management apparatus 100.

The acquisition unit 802 may store a VM type according to the configuration of each information processing apparatus 101 for each of a plurality of groups into the storage unit 801 based on the VM type table 600. The VM type is a type indicative of specifications of the VM. The acquisition unit 802 acquires, for example, a combination of VM types of individual ones of a plurality of VMs in a plurality of groups prescribed by a unit of a VM type and writes the combination of the VM types into the storage unit 801.

Consequently, the acquisition unit 802 may map, for each of the groups, the magnitude of a HW resource used in a plurality of VMs in each of the information processing apparatus 101 belonging to the group and the performance information of a service provided by the group. Therefore, the acquisition unit 802 may specify which group satisfies the SLA or the HW resource of which group is comparatively small. Since the acquisition unit 802 takes variations of combinations of HW resources to be allocated to a plurality of VMs in a unit of a VM type into consideration, it may achieve decrease of variations to be considered and the burden to be imposed when minimization of the HW resource is investigated may be reduced.

The selection unit 803 selects, for each of a plurality of groups, a movement target VM that becomes a movement target from a target group to which the VM of the selection target belongs to a different group based on the configuration information and the performance information stored for each of the plurality of groups in the storage unit 801. The VM of the selection target is a plurality of VMs that provide a service. The target group is a group to which the information processing apparatus 101 in which the VM of the selection target is being currently executed belong. The movement target VM is a VM to which deployment of a HW resource is changed from among the plurality of VMs when a plurality of VMs are to be moved between groups.

The selection unit 803 selects, for example, based on the calculation resource management table 500, a VM with regard to which deployment of a HW resource is to be changed in the case where, in each group, a plurality of VMs are to be deployed in the information processing apparatus 101 that belong to the group. This makes it possible for the selection unit 803 to specify of which VM the deployment of a HW resource is to be changed in order to execute a plurality of VMs in the individual groups.

The selection unit 803 may select a movement target VM for each of a plurality of groups based on a VM type and performance information stored for each of a plurality of groups in the storage unit 801. For example, when a plurality of VMs are to be executed with a VM type prescribed for a certain group, the selection unit 803 selects a VM in regard to which the deployment of a HW resource is to be changed based on the calculation resource management table 500 and the VM type table 600. This makes it possible for the selection unit 803 to specify in regard to which VM the deployment of a HW resource is to be changed in order to execute a plurality of VMs for providing a service corresponding to a combination of VM types in the individual groups.

The determination unit 804 decides whether or not, in the case where a movement target VM is moved to a different group, the performance value of a service corresponding to the movement target VM satisfies a reference value determined in advance. Then, when the determination unit 804 decides that the performance value satisfies the reference value, it determines movement of the movement target VM from the target group to the different group. The service corresponding to the VM of the movement target is a service provided by a plurality of VMs executed by the information processing apparatus 101 that belong to the different group and is a service same as a service that is provided by a plurality of VMs having been executed by the information processing apparatus 101 belonging to the target group. The performance value of the service is, for example, a latency or a throughput. The performance value of the service is a latency, a throughput or the like of a client apparatus used by a user of the service, which may be determined, for example, from the latency, throughput or the like of each information processing apparatus 101.

The determination unit 804 calculates a performance value of a service provided by a plurality of VMs, for example, based on the performance information of the information processing apparatus 101 that belong to a different group, and decides whether or not the performance value satisfies the SLA. Then, the determination unit 804 determines that, for example, the plurality of VMs are to be deployed to the information processing apparatus 101 that belong to the different group. Consequently, the determination unit 804 may specify a group by which the HW resource to be used for the service may possibly decrease from among the target groups. Then, the management apparatus 100 may move the VMs A to C to the different group that satisfy the SLA to achieve minimization of the HW resource.

The determination unit 804 may further decide whether or not, in the case where the movement target VM is moved to a different group, the performance value of a service corresponding to the movement target VM indicates that it is better than the performance value of the service corresponding to the movement target VM before the movement. Then, when the performance value satisfies the reference value and besides indicates that it is better, the determination unit 804 decides movement of the movement target VM from the target group to the different group. If the performance value is, for example, a latency, then a lower value thereof is better. However, if the performance is, for example, a throughput, then a higher value thereof is better. Consequently, since the determination unit 804 moves a VM in the case where the performance value of the service becomes better than that at present, enhancement of the performance value of the service may be achieved efficiently.

The determination unit 804 may further decide whether or not calculation resources of the different group are less than calculation resources of the target group. Then, when the calculation resources of the different group are less, the determination unit 804 determines movement of the movement target VM from the target group to the different group. Consequently, since the determination unit 804 moves a VM in the case where the HW resource to be used for a service becomes reduced from that at present, minimization of calculation resources to be used for the service may be achieved efficiently.

The outputting unit 805 outputs a changing instruction of deployment of a HW resource to a VM, a deployment instruction of a VM or the like. The outputting unit 805 may output a result of change of deployment of a HW resource to a VM or a result of deployment of a VM or the like. The outputting unit 805 may output performance information of each information processing apparatus 101 or a performance value of a service. The outputting form is, for example, display on a display unit, printing outputting to a printer, transmission to an external apparatus through the network I/F 403 or storage into a storage area of the memory 402, recording medium 405 or the like.

Particular Example of Functional Configuration of Management Apparatus 100

Now, a particular example of a functional configuration of the management apparatus 100 is described with reference to FIG. 9.

Figure 9:
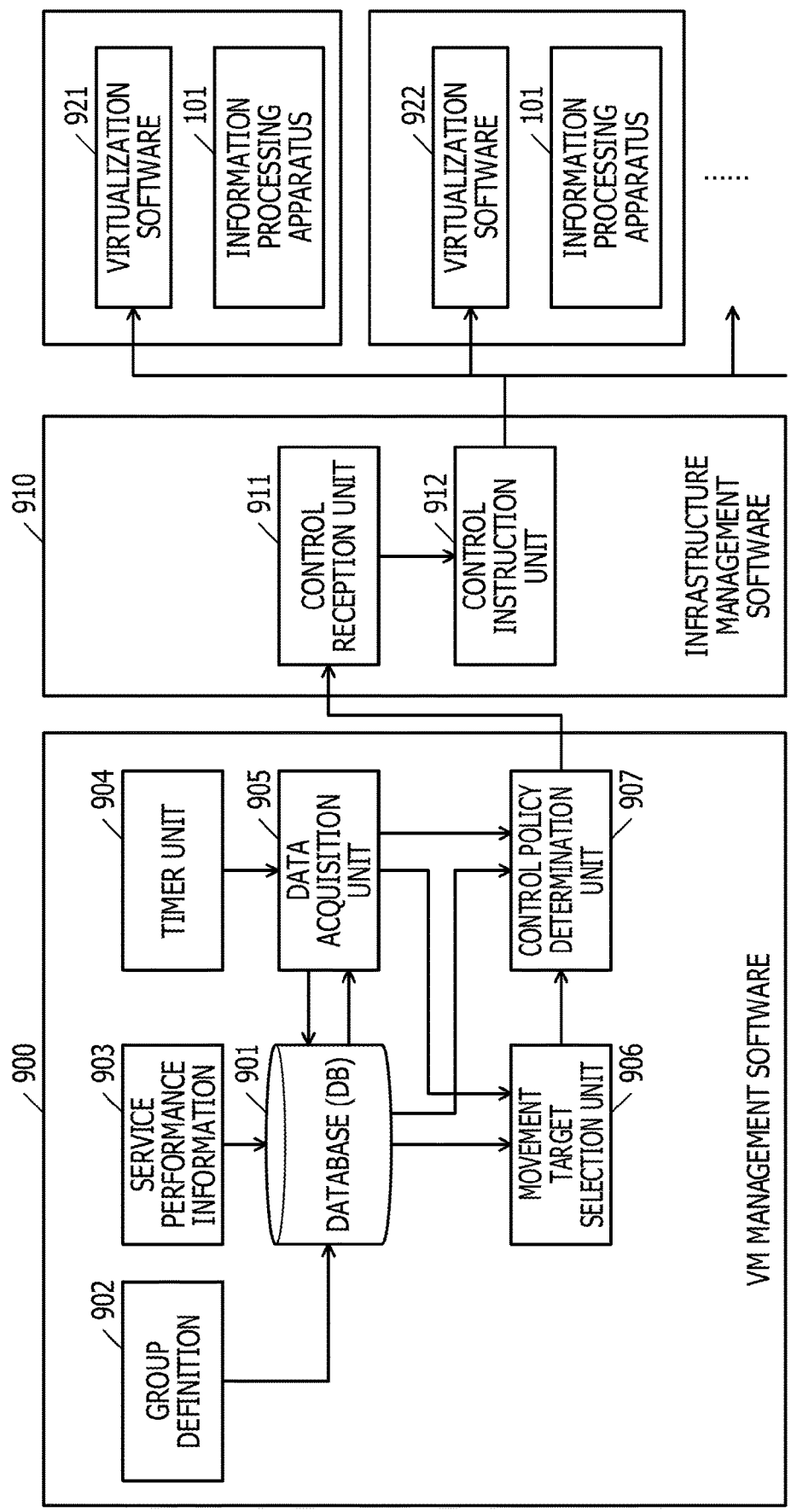
FIG. 9 is a block diagram depicting a particular example of a functional configuration of a management apparatus.

FIG. 9 is a block diagram depicting a particular example of a functional configuration of the management apparatus 100. As depicted in FIG. 9, the management apparatus 100 manages a DB 901, a group definition 902, service performance information 903, a timer unit 904, a data acquisition unit 905, a movement target selection unit 906 and a control policy determination unit 907 by VM management software 900. The management apparatus 100 manages a control reception unit 911 and a control instruction unit 912 by infrastructure management software 910.

The DB 901 is a storage area for storing a HW resource management table, a VM type table 600, a VM operating situation sheet 700 and so forth. The group definition 902 is information that defines a VM group including a plurality of VMs that provide a service, inputted by a manager of the information processing system 110. The service performance information 903 is information indicative of a service performance at present of the service. The service performance information 903 is acquired, for example, by the data acquisition unit 905.

The timer unit 904 outputs a request input to the data acquisition unit 905 after every fixed interval of time. The data acquisition unit 905 acquires a combination of VM types and the service performance information 903 indicative of a service performance of a service provided by the combination based on the DB 901. The data acquisition unit 905 updates the DB 901 based on the acquired combination of VM types and the service performance information 903 indicative of the service performance of the service provided by the combination.

The movement target selection unit 906 selects a VM of a movement target based on the DB 901. The control policy determination unit 907 determines a control policy on a HW resource to be applied to the selected VM of a movement target. The control policy determination unit 907 determines, for example, a magnitude of a CPU resource to be deployed to the selected VM or determines an information processing apparatus 101 to which the selected VM is to be moved. The control policy determination unit 907 outputs the selected VM and the determined control policy to the control reception unit 911.

The control reception unit 911 accepts the VM of the control target and the control policy from the control policy determination unit 907 and outputs them to the control instruction unit 912. The control instruction unit 912 outputs a control signal in accordance with the control policy to the information processing apparatus 101 that is executing the VM of the control target. Software 921, 922 or the like that operates on the information processing apparatus 101 controls the virtualization environment of the information processing apparatus 101 in accordance with the control signal and controls deployment of a HW resource to the VM or the like. Consequently, the control instruction unit 912 controls the information processing apparatus 101 and may control the HW resource to be allocated to the VM.

Operation Example 1 of Management Apparatus 100

Now, an operation example 1 of the management apparatus 100 is described with reference to FIGS. 10 to 17.

FIGS. 10 to 17 are explanatory views depicting the operation example 1 of a management apparatus 100. The operation example 1 is an operation example in the case where the management apparatus 100 uses the latency [usec] as the performance information.

Referring first to FIG. 10, the management apparatus 100 creates a plurality of combinations of HW resources in a unit of a VM type and creates a VM operating situation sheet 700. The management apparatus 100 creates, for example, 125 combinations of five VM types relating to the VM A, five VM types relating to the VM B and five VM types relating to the VM C based on the VM type table 600. The VM types are, for example, Low Spec, CPU Rich, MEM Rich, NET Rich, High Spec and so forth. The management apparatus 100 stores the created combinations by setting the combinations to fields of VM A, VM B and VM C in records of the VM operating situation sheet 700.

This makes it possible for the management apparatus 100 to take comparatively many variations in which a HW resource is deployed to a plurality of VMs that provide a certain service into consideration. Since the management apparatus 100 takes variations in which a HW resource is deployed to a plurality of VMs in a unit of a VM type into consideration, it is possible to reduce the number of variations to be considered and achieve reduction of the burden to be imposed when minimization of HW resources is investigated. Now, description is given of FIG. 11.

Referring to FIG. 11, the management apparatus 100 selects a combination in regard to which the HW resource is smallest from among one or more combinations of the VM types of the VM A in which the VM types are made variable and the VM types of the VM B and the VM C in which the VM types remain fixed. In the example of FIG. 11, the management apparatus 100 selects a record 1100 of the VM operating situation sheet 700. The management apparatus 100 deploys the VMs A to C to a plurality of information processing apparatus 101 and executes a benchmark such that the VM types of the VMs A to C are changed based on the selected record 1100.

Thereafter, the management apparatus 100 acquires 6 CPU, 24 GB, 1 Gbit/s×3 and so forth as information of the size of the HW resource to be used in a service and stores them by setting them to the field for total HW resource of the VM operating situation sheet 700. The management apparatus 100 acquires the latency 48 usec of the service and stores it by setting it to the field for service performance of the VM operating situation sheet 700. Now, description is given with reference to FIG. 12.

In FIG. 12, the management apparatus 100 selects a combination in regard to which the HW resource is greatest from among one or more combinations of the VM types of the VM A in which the VM types are made variable and the VM types of the VM B and the VM C in which the VM types remain fixed. In the example of FIG. 12, the management apparatus 100 selects a record 1200 of the VM operating situation sheet 700. The management apparatus 100 deploys the VMs A to C to a plurality of information processing apparatus 101 and executes a benchmark such that the VM types of the VMs A to C are changed based on the selected record 1200.

Thereafter, the management apparatus 100 acquires 8 CPU, 32 GB, 1 Gbit/s×2+10 Gbit/s×1 and so forth as information of the size of the HW resource to be used in a service and stores them by setting them to the field for total HW resource of the VM operating situation sheet 700. The management apparatus 100 acquires a latency 38 usec of the service and stores it by setting it to the field for service performance of the VM operating situation sheet 700. Now, description is given with reference to FIG. 13.

In FIG. 13, the management apparatus 100 decides whether or not, in the case where the combination of VM types is changed from the combination in which the HW resource is smallest corresponding to the record 1100 to another combination in which the HW resource is greatest corresponding to the record 1200, the latency of the service is improved by 10% or more. Since the latency is improved by 10% or more, the management apparatus 100 does not omit processes for the other combinations between the combination in which the HW resource is smallest corresponding to the record 1100 and the combination in which the HW resource is greatest corresponding to the record 1200.

In the example of FIG. 13, the management apparatus 100 successively selects records 1300 to 1302 of the VM operating situation sheet 700. First, the management apparatus 100 deploys the VMs A to C to the plurality of information processing apparatus 101 and executes a benchmark such that the VM types of the VMs A to C are changed based on the selected record 1300.

Thereafter, the management apparatus 100 acquires 8 CPU, 24 GB, 1 Gbit/s×3 and so forth as information of the size of the HW resource to be used in a service and stores them by setting them to the field for total HW resource of the VM operating situation sheet 700. The management apparatus 100 acquires a latency 48 usec of the service and stores it by setting it to the field for service performance of the VM operating situation sheet 700.

The management apparatus 100 deploys the VMs A to C to the plurality of information processing apparatus 101 and executes a benchmark such that the VM types of the VMs A to C are changed based on the selected record 1301.

Thereafter, the management apparatus 100 acquires 6 CPU, 32 GB, 1 Gbit/s×3 and so forth as information of the size of the HW resource to be used in a service and stores them by setting them to the field for total HW resource of the VM operating situation sheet 700. The management apparatus 100 acquires a latency 46 usec of the service and stores it by setting it to the field for service performance of the VM operating situation sheet 700.

The management apparatus 100 deploys the VMs A to C to the plurality of information processing apparatus 101 and executes a benchmark such that the VM types of the VMs A to C are changed based on the selected record 1302.

Thereafter, the management apparatus 100 acquires 6 CPU, 24 GB, 1 Gbit/s×2+10 Gbit/s×1 and so forth as information of the size of the HW resource to be used in the service and stores them by setting them to the field for total HW resource of the VM operating situation sheet 700. The management apparatus 100 acquires a latency 45 usec of the service and stores it by setting it to the field for service performance of the VM operating situation sheet 700. Now, description is given with reference to FIG. 14.

In FIG. 14, the management apparatus 100 selects a combination in regard to which the HW resource is smallest from among one or more combinations of the VM types of the VM B in which the VM types are made variable and the VM types of the VM A and the VM C in which the VM types remain fixed. In the example of FIG. 14, the management apparatus 100 selects a record 1400 of the VM operating situation sheet 700. The management apparatus 100 deploys the VMs A to C to the plurality of information processing apparatus 101 and executes a benchmark such that the VM types of the VMs A to C are changed based on the selected record 1400.

Thereafter, the management apparatus 100 acquires 6 CPU, 24 GB, 1 Gbit/s×3 and so forth as information of the size of the HW resource to be used in the service and stores them by setting them to the field for total HW resource of the VM operating situation sheet 700. The management apparatus 100 acquires a latency 48 usec of the service and stores it by setting it to the field for service performance of the VM operating situation sheet 700. Now, description is given with reference to FIG. 15.

In FIG. 15, the management apparatus 100 selects a combination in regard to which the HW resource is greatest from among one or more combinations of the VM types of the VM B in which the VM types are made variable and the VM types of the VM A and the VM C in which the VM types remain fixed. In the example of FIG. 15, the management apparatus 100 selects a record 1500 of the VM operating situation sheet 700. The management apparatus 100 deploys the VMs A to C to the plurality of information processing apparatus 101 and executes a benchmark such that the VM types of the VMs A to C are changed based on the selected record 1500.

Thereafter, the management apparatus 100 acquires 8 CPU, 32 GB, 1 Gbit/s×2+10 Gbit/s×1 and so forth as information of the size of the HW resource to be used in the service and stores them by setting them to the field for total HW resource of the VM operating situation sheet 700. The management apparatus 100 acquires a latency 45 usec of the service and stores it by setting it to the field for service performance of the VM operating situation sheet 700. Now, description is given with reference to FIG. 16.

In FIG. 16, the management apparatus 100 decides whether or not, in the case where the combination of VM types is changed from the combination in which the HW resource is smallest corresponding to the record 1400 to another combination in which the HW resource is greatest corresponding to a record 1500, the latency of the service is improved by 10% or more. Since the latency is not improved by 10% or more, the management apparatus 100 omits processes for the other combinations between the combination in which the HW resource is smallest corresponding to the record 1400 and the combination in which the HW resource is greatest corresponding to the record 1500.

In the example of FIG. 16, the management apparatus 100 sets "benchmark is not carried out" to the field for total HW resource and the field for service performance of records 1600 to 1602 of the VM operating situation sheet 700. This makes it possible for the management apparatus 100 to reduce the period of time required when a VM is deployed to the information processing apparatus 101 and a benchmark is executed to acquire performance information and reduce the burden to be imposed on the management apparatus 100. Thereafter, the management apparatus 100 sets the field for total HW resource and the field for service performance of the VM operating situation sheet 700 similarly. Now, description is given with reference to FIG. 17.

In FIG. 17, the management apparatus 100 selects a combination in regard to which the total HW resource is smallest from among combinations of the VM types in which the service performance satisfies a target service performance in the VM operating situation sheet 700. The target service performance is a performance value corresponding to the SLA. Then, the management apparatus 100 deploys the VMs A to C in the selected combination of VM types to the information processing apparatus 101.

In the example of FIG. 17, the management apparatus 100 particularly selects a combination of VM types corresponding to a record 1700 from among combinations of VM types in which the latency of the service performance is lower than the latency of the target service performance and by which the SLA is satisfied. Then, the management apparatus 100 deploys the VMs A to C with the combination of VM types to the plurality of information processing apparatus 101.

Consequently, the management apparatus 100 may minimize the HW resource to be used in the service within a range within which the SLA is satisfied. Therefore, the management apparatus 100 may achieve reduction of the power consumption relating to the service. The management apparatus 100 may assure a HW resource that may be utilized for a different service and may be made possible to provide more services on the information processing system 110. When the load of a certain service increases suddenly, the management apparatus 100 may assure empty HW resources to which the service may be deployed and the enhancement of the stability of the information processing system 110 may be achieved.

Here, a case is conceivable in which attention is paid to VMs one by one to minimize a HW resource so as to satisfy the SLA. For example, a case is conceivable in which attention is paid to a VM that implements functions of an application server without taking a HW resource to be deployed to a VM that implements functions of a front end server into consideration to minimize the HW resource to be deployed to the VM.

However, the network bandwidth of the front end server becomes a bottleneck, and even if a HW resource to be deployed to the VM that implements functions of the application server is increased, the performance value of the service is less likely to become better. Therefore, there is the possibility that, in order to satisfy the SLA, it is decided that it is required to deploy a comparatively large HW resource to the VM that implements functions of the application server. Furthermore, there is the possibility also that it is decided that the service does not satisfy the SLA. As a result, there is the possibility that it is difficult to minimize the HW resource to be used for the service.

In contrast, the management apparatus 100 may take it into consideration that a service is provided by a plurality of VMs in addition to provide a service by a single VM. The management apparatus 100 may take a greater number of variations in which a HW resource is deployed to a VM into consideration in comparison with that in an alternative case in which attention is paid to VMs one by one to minimize a HW resource so as to satisfy the SLA. Therefore, the management apparatus 100 may reduce a HW resource to be used in a service within a range within which the SLA is satisfied.

Although a case is described here in which the management apparatus 100 creates a plurality of combinations of HW resources in a unit of a VM type, this is not restrictive. For example, the management apparatus 100 may specify a size of a HW resource capable of being deployed to each VM and create a plurality of combinations of HW resources capable of being deployed to each of the VMs.

For example, the management apparatus 100 specifies a minimum number and a maximum number of CPUs that may be deployed to each VM, partitions the interval between the minimum number and the maximum number in a given unit and specifies a plurality of candidates for a number of CPUs to be deployed to each of the VMs. Similarly, the management apparatus 100 specifies a plurality of candidates for a storage capacity to be applied to each VM and a plurality of candidates for a network bandwidth. Then, the management apparatus 100 combines the candidates to create a plurality of combinations of HW resources to be deployed to each VM and sets the combinations to the VM operating situation sheet 700.

Example of Management Processing Procedure in Working Example 1

Now, an example of a management processing procedure in the working example 1 is described with reference to FIGS. 18 to 22.

Figure 18:
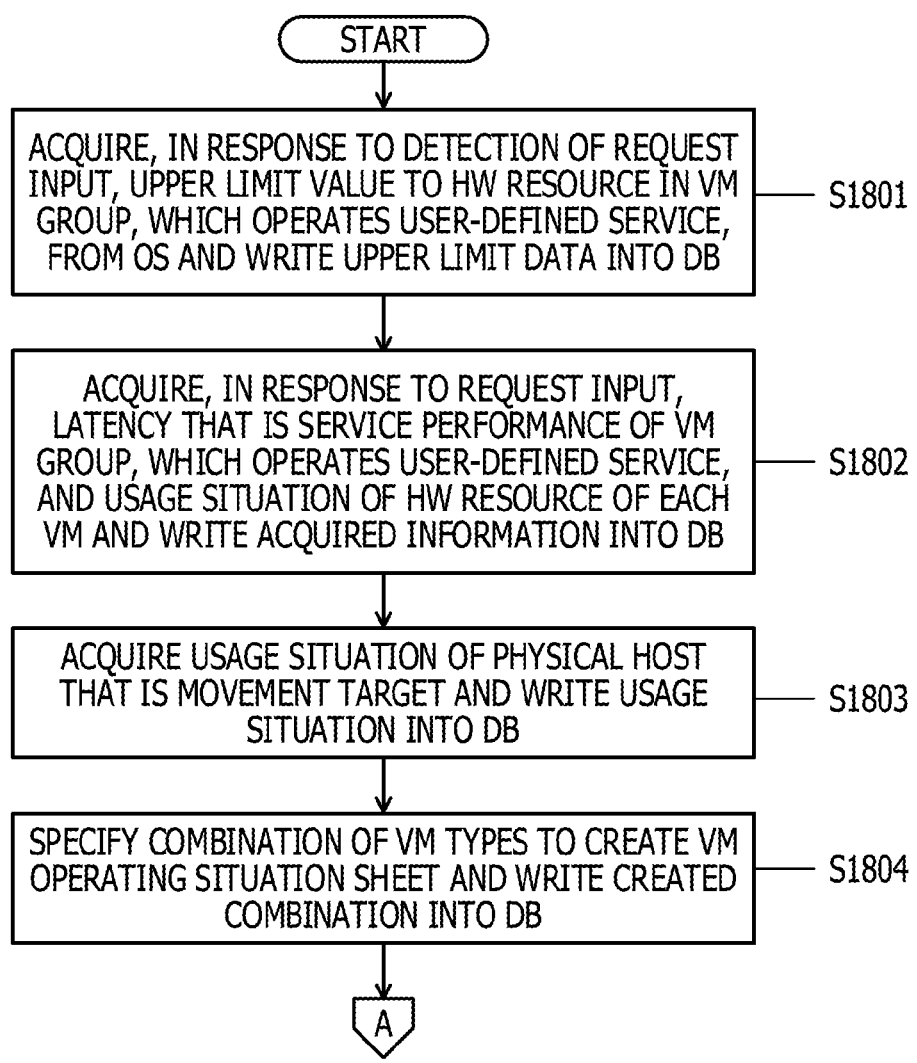
FIG. 18 is a flow chart (part 1) depicting an example of a management processing procedure in a working example 1.

FIGS. 18 to 22 are flow charts depicting the example of a management processing procedure in a working example 1. Referring to FIG. 18, the data acquisition unit 905 acquires an upper limit to a HW resource in a VM group, which operates a user-defined service, from the OS in response to detection of a request input generated by the timer unit 904 and writes the upper limit value into the DB 901 (S1801).

The data acquisition unit 905 acquires a latency that is a service performance and a usage situation of a HW resource of each VM in regard to the VM group that is to operate the user-defined service in response to a request input and writes the acquired latency and usage situation into the DB 901 (S1802).

The data acquisition unit 905 acquires and writes a usage situation of a physical host that is a movement target into the DB 901 (S1803). The data acquisition unit 905 specifies combinations of VM types and creates and writes a VM operating situation sheet 700 into the DB 901 (S1804). The management apparatus 100 advances the processing to a process at S1901 of FIG. 19A.

Figure 19A:
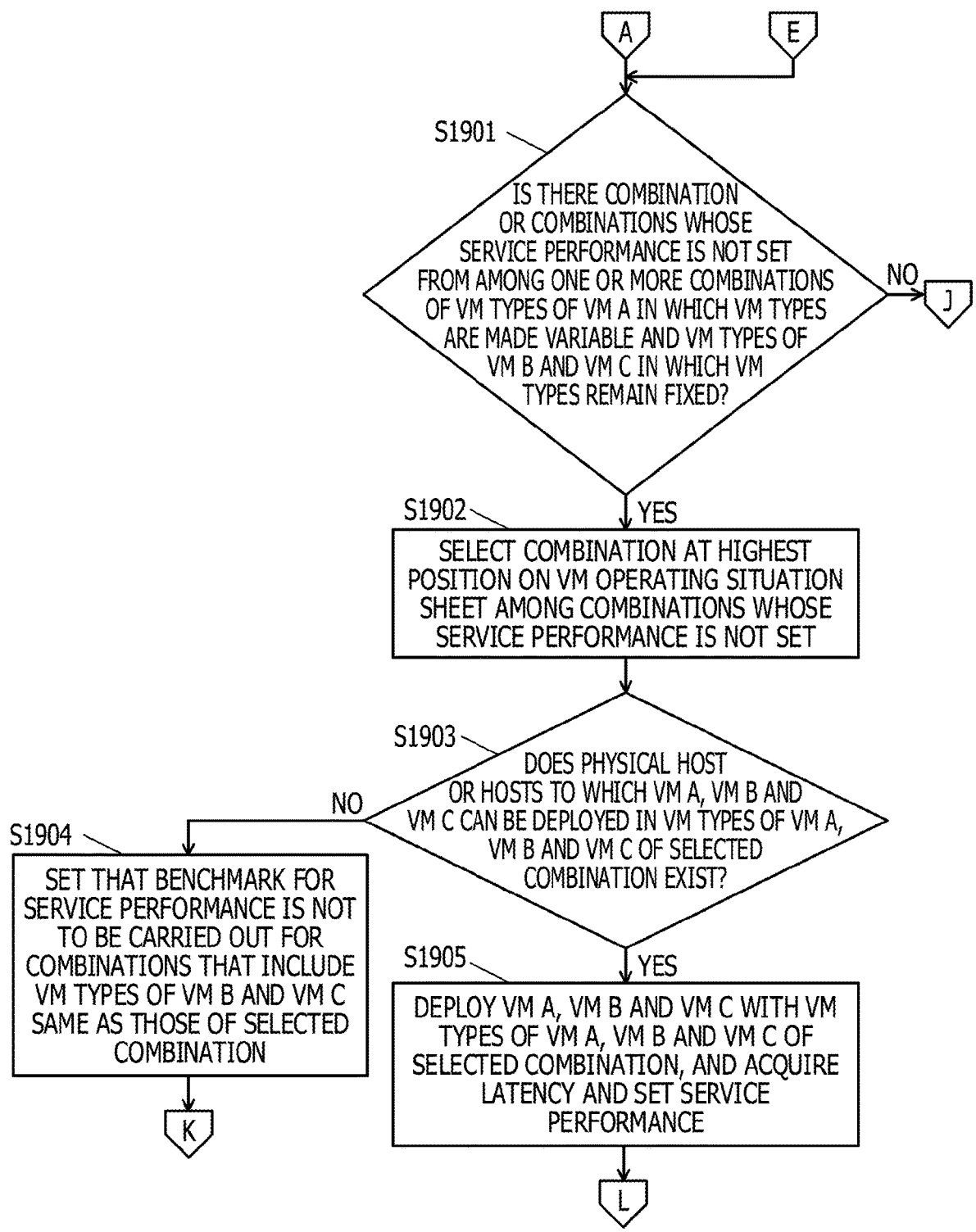
FIGS. 19A and 19B are flow charts (part 2) depicting the example of a management processing procedure in a working example 1.

Referring to FIG. 19A, the data acquisition unit 905 decides whether or not there is a combination or combinations whose service performance is not set on the VM operating situation sheet 700 from among one or more combinations of the VM types of the VM A in which the VM types are made variable and the VM types of the VM B and the VM C in which the VM types remain fixed (S1901). Here, in the case where there is not any combination whose service performance is not set (S1901: No), the management apparatus 100 advances the processing to a process at S2001 of FIG. 20.

On the other hand, in the case where there is a combination or combinations whose service performance is not set (S1901: Yes), the data acquisition unit 905 selects a combination that is at the highest position on the VM operating situation sheet 700 among the combinations whose service performance is not set (S1902).

The control policy determination unit 907 decides whether or not there exists a physical host or hosts to which the VM A, VM B and VM C may be deployed in VM types of the VM A, VM B and VM C of the selected combination (S1903). Here, in the case where no such physical host exists (S1903: No), the control policy determination unit 907 sets that the benchmark for the service performance is not to be carried out for combinations that include the VM types of the VM B and the VM C same as those of the selected combination (S1904). The management apparatus 100 advances the processing to a process at S2001 of FIG. 20.

On the other hand, in the case where such a physical host as described above exists (S1903: Yes), the control policy determination unit 907 advances the processing to a process at step S1905. The control policy determination unit 907 deploys the VM A, VM B and VM C with the VM types of the VM A, VM B and VM C of the selected combination, and acquires the latency in regard to the combination and sets a service performance (S1905).

Figure 19B:
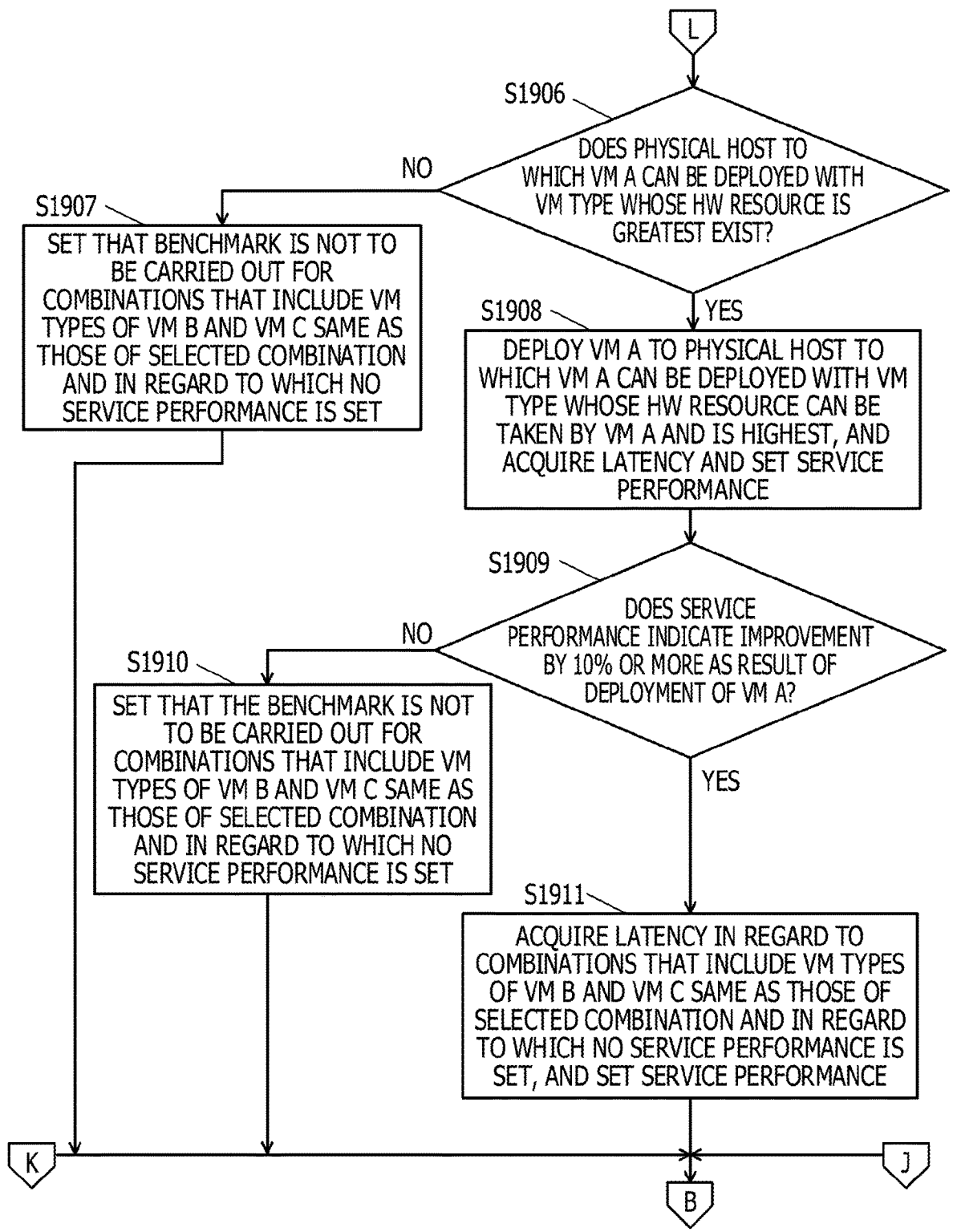

Referring to FIG. 19B, the control policy determination unit 907 decides whether or not there exists a physical host to which the VM A may be deployed with the VM type whose HW resource is greatest (S1906). Here, in the case where no such physical host exists (S1906: No), the control policy determination unit 907 advances the processing to a process at S1907. The control policy determination unit 907 sets that the benchmark for the service performance is not to be carried out for combinations that include the VM types of the VM B and the VM C same as those of the selected combination and in regard to which no service performance is set (S1907). The management apparatus 100 advances the processing to a process at S2001 of FIG. 20.

On the other hand, in the case where such a physical host as described above exists (S1906: Yes), the control policy determination unit 907 deploys the VM A to a physical host to which the VM A may be deployed with the VM type whose HW resource may be taken by the VM A and is highest, and acquires the latency and sets a service performance (S1908).

The control policy determination unit 907 decides whether or not the service performance indicates improvement by 10% or more as a result of the deployment of the VM A (S1909). Here, in the case where the service performance does not indicate such improvement (S1909: No), the control policy determination unit 907 advances the processing to a process at S1910. The control policy determination unit 907 sets that the benchmark for the service performance is not to be carried out for combinations that include the VM types of the VM B and the VM C same as those of the selected combination and in regard to which no service performance is set (S1910). The management apparatus 100 advances the processing to a process at S2001 of FIG. 20.

On the other hand, in the case where the service performance indicates such improvement as described above (S1909: Yes), the control policy determination unit 907 advances the processing to a process at S1911. The control policy determination unit 907 acquires the latency in regard to combinations that include the VM types of the VM B and the VM C same as those of the selected combination and in regard to which no service performance is set, and sets a service performance (S1911). The management apparatus 100 advances the processing to a process at S2001 of FIG. 20.

Figure 20A:
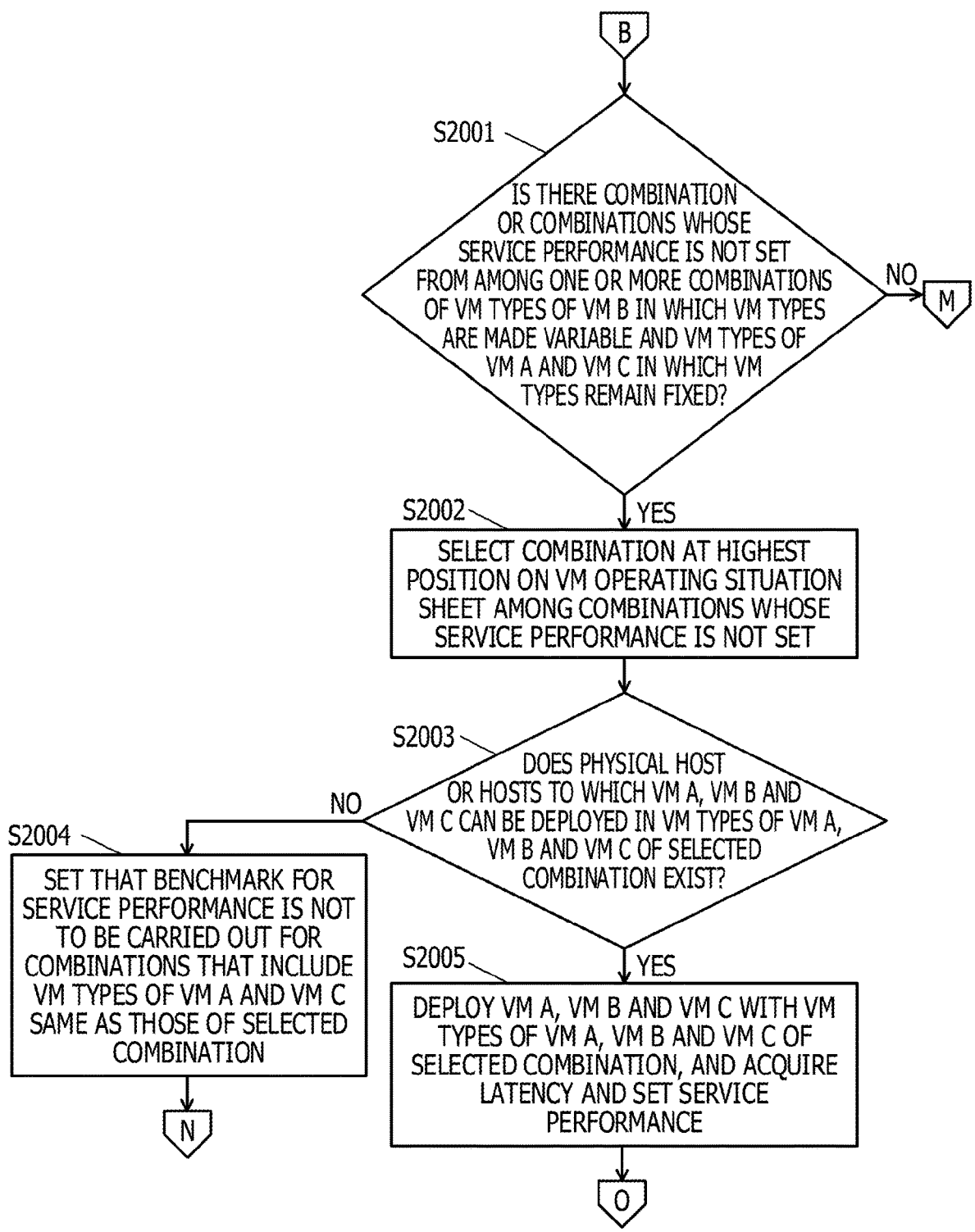
FIGS. 20A and 20B are flow charts (part 3) depicting the example of a management processing procedure in a working example 1.

Referring to FIG. 20A, the data acquisition unit 905 decides whether or not there exists a combination or combinations whose service performance is not set on the VM operating situation sheet 700 from among one or more combinations of the VM types of the VM B in which the VM types are made variable and the VM types of the VM A and the VM C in which the VM types remain fixed (S2001). Here, in the case where there is not any combination whose service performance is not set (S2001: No), the management apparatus 100 advances the processing to a process at S2101 of FIG. 21.

On the other hand, in the case where there is a combination or combinations whose service performance is not set (S2001: Yes), the data acquisition unit 905 selects a combination that is at the uppermost position on the VM operating situation sheet 700 among the combinations whose service performance is not set (S2002).

The control policy determination unit 907 decides whether or not there exists a physical host to which the VM A, VM B and VM C may be deployed with the VM types of the VM A, VM B and VM C of the selected combination (S2003). Here, in the case where no such physical host exists (S2003: No), the control policy determination unit 907 sets that the benchmark for the service performance is not to be carried out for combinations that include the VM types of the VM A and the VM C same as those of the selected combination (S2004). Then, the management apparatus 100 advances the processing to a process at S2101 of FIG. 21.

On the other hand, in the case where such a physical host as described above exists (S2003: Yes), the control policy determination unit 907 advances the processing to a process at S2005. The control policy determination unit 907 deploys the VM A, VM B and VM C with the VM types of the VM A, VM B and VM C of the selected combination, and acquires the latency in regard to the combination and sets a service performance (S2005).

Figure 20B:
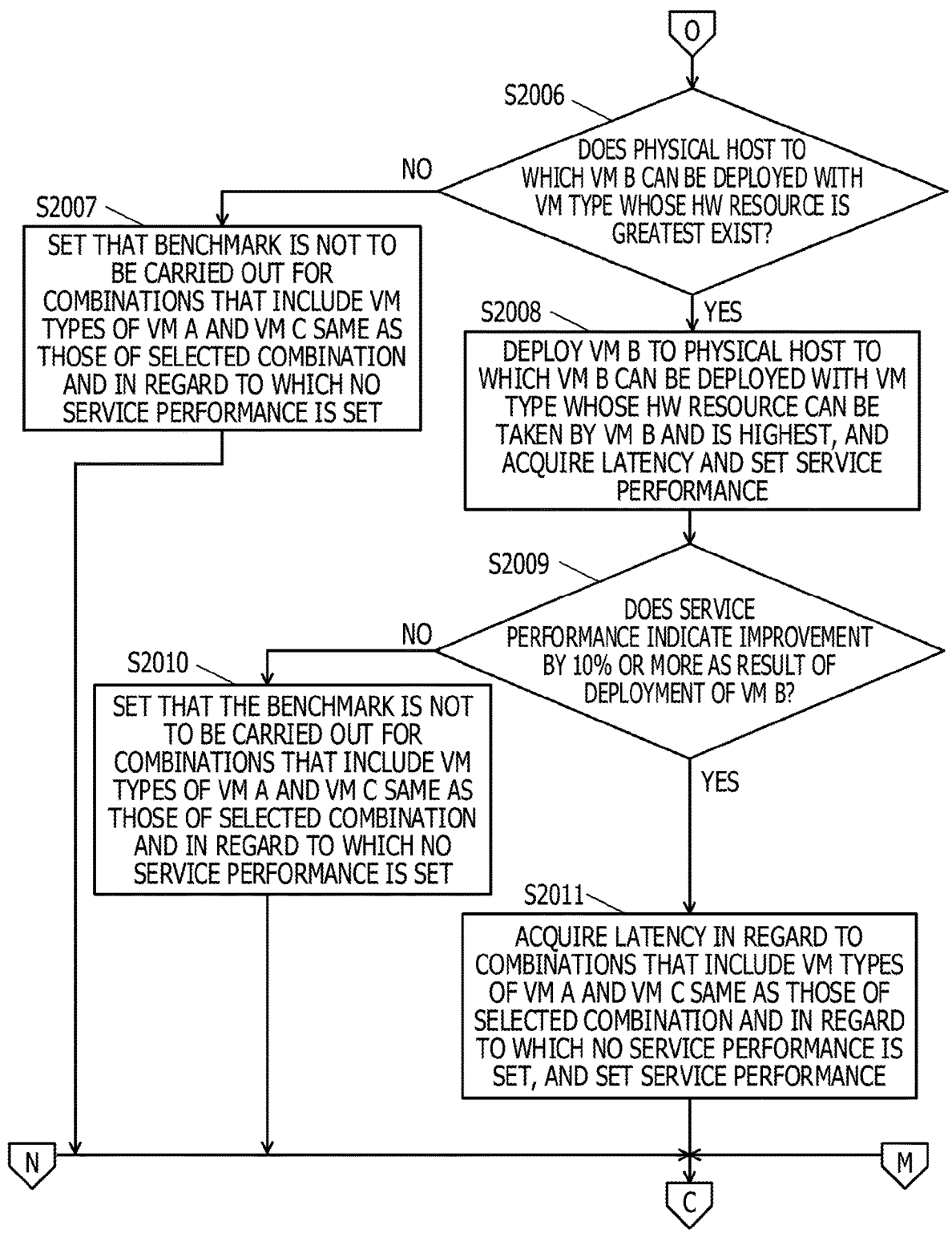

Referring to FIG. 20B, the control policy determination unit 907 decides whether or not there exists a physical host to which the VM B may be deployed with the VM type whose HW resource is greatest (S2006). Here, in the case where no such physical host exists (S2006: No), the control policy determination unit 907 advances the processing to a process a process at S2007. The control policy determination unit 907 sets that the benchmark for the service performance is not to be carried out for combinations that include the VM types of the VM A and the VM C same as those of the selected combination and in regard to which no service performance is set (S2007). The management apparatus 100 advances the processing to a process at S2101 of FIG. 21.

On the other hand, in the case where such a physical host as described above exists (S2006: Yes), the control policy determination unit 907 deploys the VM B to a physical host to which the VM B may be deployed with the VM type whose HW resource may be taken by the VM B and is highest, and acquires the latency and sets a service performance (S2008).

The control policy determination unit 907 decides whether or not the service performance indicates improvement by 10% or more as a result of the deployment of the VM B (S2009). Here, in the case where the service performance does not indicate such improvement (S2009: No), the control policy determination unit 907 advances the processing to a process at S2010. The control policy determination unit 907 sets that the benchmark for the service performance is not to be carried out for combinations that include the VM types of the VM A and the VM C same as those of the selected combination and in regard to which no service performance is set (S2010). The management apparatus 100 advances the processing to a process at S2101 of FIG. 21.

On the other hand, in the case where the service performance indicates such improvement as described above (S2009: Yes), the control policy determination unit 907 advances the processing to a process at S2011. The control policy determination unit 907 acquires the latency in regard to combinations that include the VM types of the VM A and the VM C same as those of the selected combination and in regard to which no service performance is set, and sets a service performance (S2011). The management apparatus 100 advances the processing to a process at S2101 of FIG. 21.

Figure 21A:
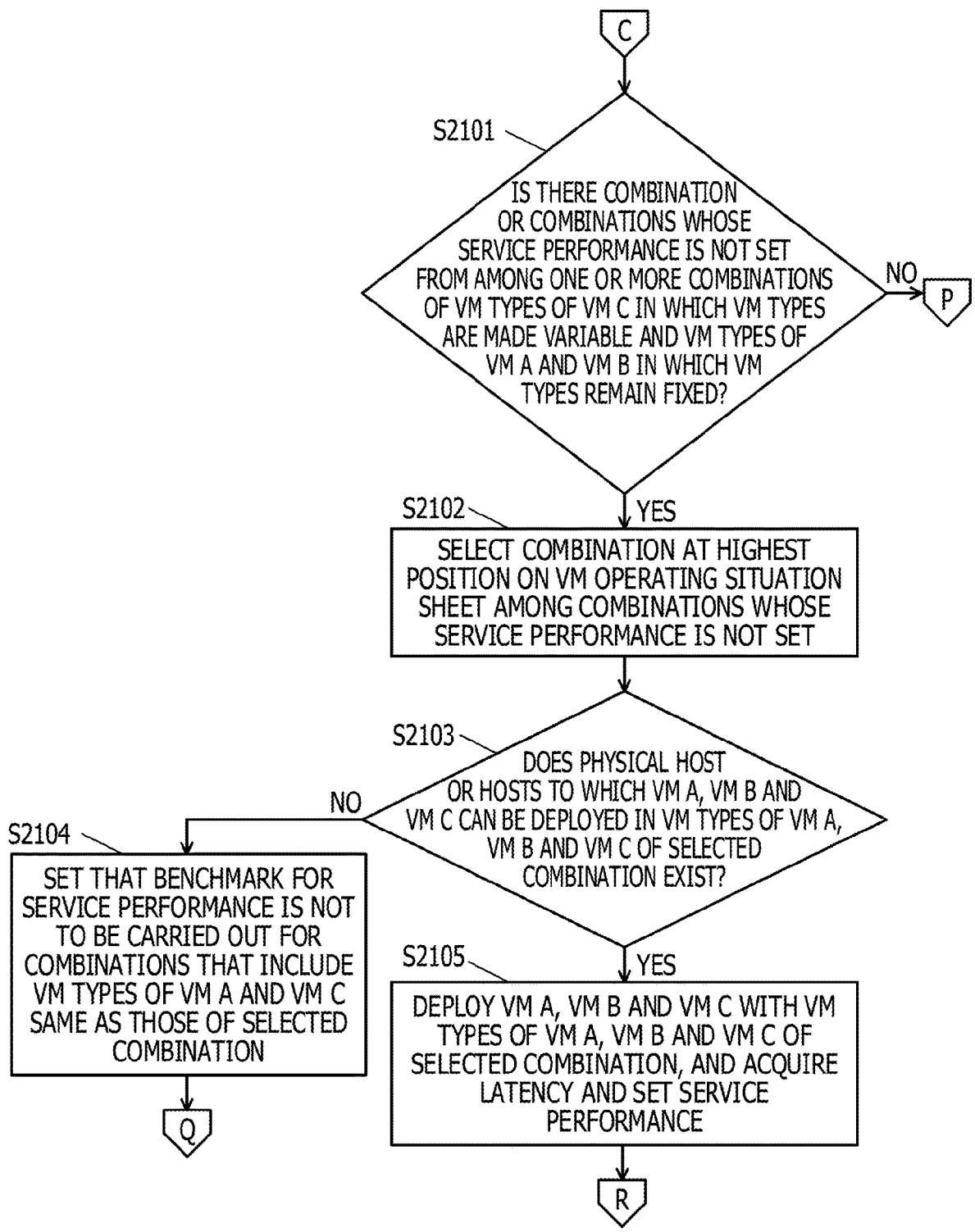
FIGS. 21A and 21B are flow charts (part 4) depicting the example of a management processing procedure in a working example 1.

Referring to FIG. 21A, the data acquisition unit 905 decides whether or not there exists a combination or combinations whose service performance is not set on the VM operating situation sheet 700 from among one or more combinations of the VM types of the VM C in which the VM types are made variable and the VM types of the VM A and the VM B in which the VM types remain fixed. Here, in the case where there is not any combination whose service performance is not set (S2101: No), the management apparatus 100 advances the processing to a process at S2201 of FIG. 22.

On the other hand, in the case where there is a combination or combinations whose service performance is not set (S2101: Yes), the data acquisition unit 905 selects a combination that is at the uppermost position on the VM operating situation sheet 700 among the combinations whose service performance is not set (S2102).

The control policy determination unit 907 decides whether or not there exists a physical host to which the VM A, VM B and VM C may be deployed with the VM types of the VM A, VM B and VM C of the selected combination (S2103). Here, in the case where no such physical host exists (S2103: No), the control policy determination unit 907 sets that the benchmark for the service performance is not to be carried out for combinations that include the VM types of the VM A and the VM B same as those of the selected combination (S2104). Then, the management apparatus 100 advances the processing to a process at S2201 of FIG. 22.

On the other hand, in the case where such a physical host as described above exists (S2103: Yes), the control policy determination unit 907 advances the processing to a process at S2105. The control policy determination unit 907 deploys the VM A, VM B and VM C with the VM types of the VM A, VM B and VM C of the selected combination, and acquires the latency in regard to the combination and sets a service performance (S2105).

Figure 21B:
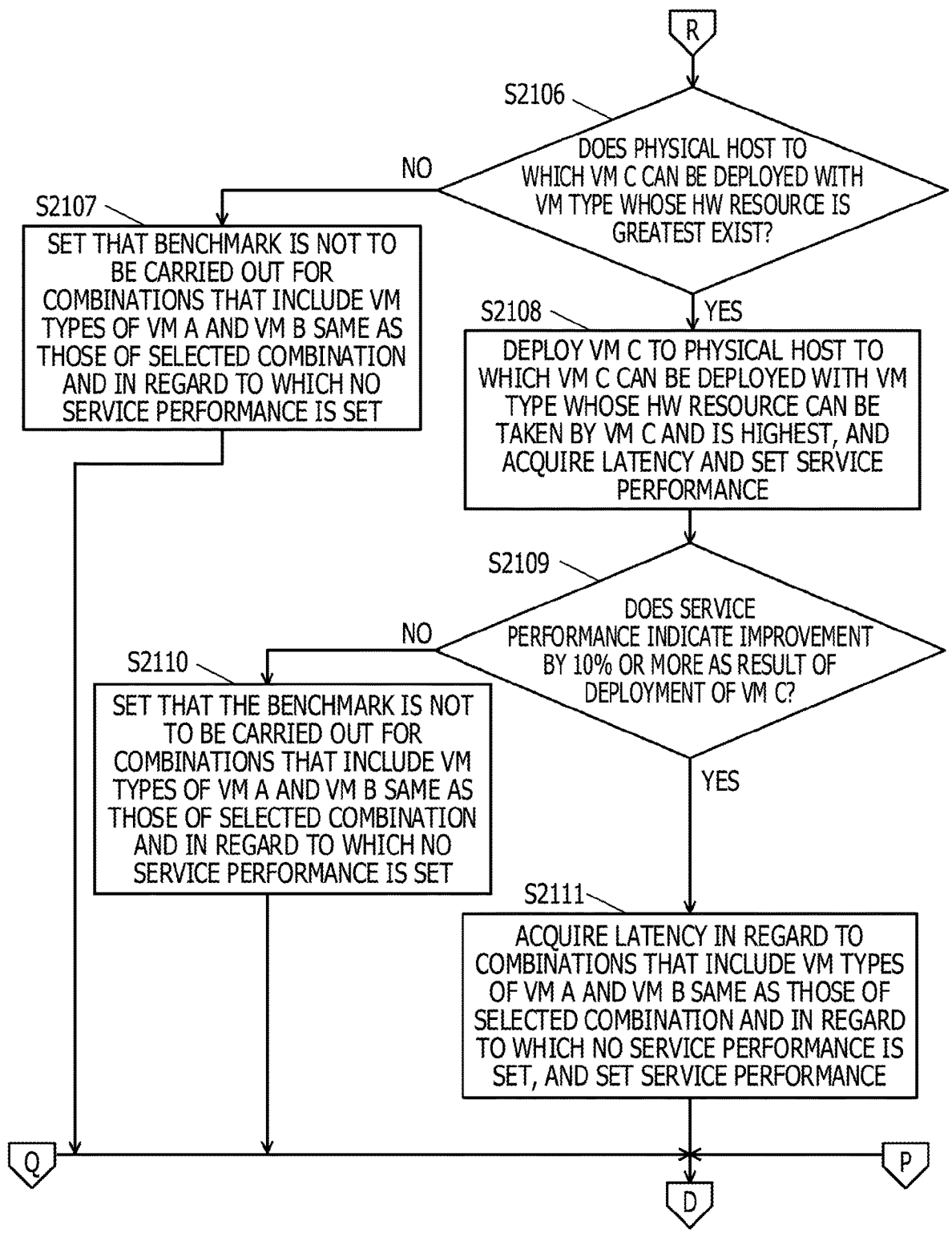

Referring to FIG. 21B, the control policy determination unit 907 decides whether or not there exists a physical host to which the VM C may be deployed with the VM type whose HW resource is greatest (S2106). Here, in the case where no such physical host exists (S2106: No), the control policy determination unit 907 advances the processing to a process at S2107. The control policy determination unit 907 sets that the benchmark for the service performance is not to be carried out for combinations that include the VM types of the VM A and the VM B same as those of the selected combination and in regard to which no service performance is set (S2107). The management apparatus 100 advances the processing to a process at S2201 of FIG. 22.

On the other hand, in the case where such a physical host as described above exists (S2106: Yes), the control policy determination unit 907 deploys the VM C to a physical host to which the VM C may be deployed with the VM type whose HW resource may be taken by the VM B and is highest, and acquires the latency and sets a service performance (S2108).

The control policy determination unit 907 decides whether or not the service performance indicates improvement by 10% or more as a result of the deployment of the VM C (S2109). Here, in the case where the service performance does not indicate such improvement (S2109: No), the control policy determination unit 907 advances the processing to a process at S2110. The control policy determination unit 907 sets that the benchmark for the service performance is not to be carried out for combinations that include the VM types of the VM A and the VM B same as those of the selected combination and in regard to which no service performance is set (S2110). The management apparatus 100 advances the processing to a process at S2201 of FIG. 22.

On the other hand, in the case where the service performance indicates such improvement as described above (S2109: Yes), the control policy determination unit 907 advances the processing to a process at S2111. The control policy determination unit 907 acquires the latency in regard to combinations that include the VM types of the VM A and the VM B same as those of the selected combination and in regard to which no service performance is set, and sets a service performance (S2111). The management apparatus 100 advances the processing to a process at S2201 of FIG. 22.

Figure 22:
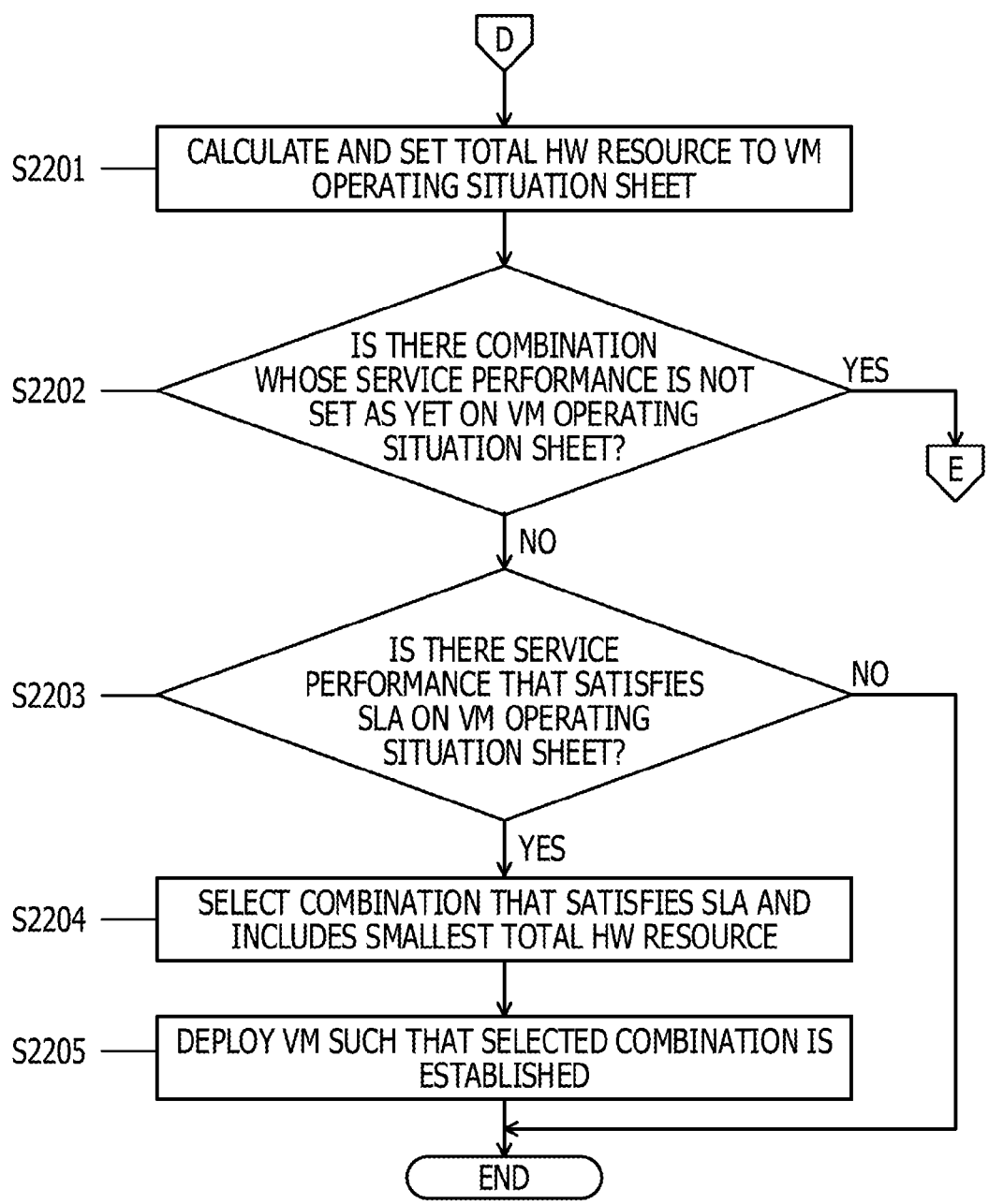
FIG. 22 is a flow chart (part 5) depicting the example of a management processing procedure in a working example 1.

Referring to FIG. 22, the data acquisition unit 905 calculates and sets a total HW resource to the VM operating situation sheet 700 (S2201). The data acquisition unit 905 refers to the DB 901 to decide whether or not there exists a combination whose service performance is not set on the VM operating situation sheet 700 (S2202). Here, in the case where there exists a combination whose service performance is not set (S2202: Yes), the management apparatus 100 advances the processing to the process at S1901 of FIG. 19.

On the other hand, in the case where there is no combination whose service performance is not set (S2202: No), the movement target selection unit 906 refers to the DB 901 to decide whether or not there exists a service performance that satisfies the SLA on the VM operating situation sheet 700 (S2203). Here, in the case where there exists no service performance that satisfies the SLA (S2203: No), the management apparatus 100 ends the management process.

On the other hand, in the case where there exists a service performance that satisfies the SLA (S2203: Yes), the control policy determination unit 907 selects a combination that satisfies the SLA and whose total HW resource is smallest (S2204). The control policy determination unit 907 deploys the VMs such that the selected combination is established (S2205). The management apparatus 100 ends the management process. This makes it possible for the management apparatus 100 to minimize the HW resource to be used in the service within a range within which the SLA is satisfied.

Operation Example 2 of Management Apparatus 100

Now, an operation example 2 of the management apparatus 100 is described with reference to FIGS. 23 to 27.

FIGS. 23 to 27 are explanatory views depicting the operation example 2 of a management apparatus 100. The operation example 2 is an operation example in the case where the management apparatus 100 uses the processing amount [ops (operations)] or the throughput [ops/sec] as the performance information.

Referring first to FIG. 23, the management apparatus 100 creates a plurality of combinations of HW resources in a unit of a VM type and creates a VM operating situation sheet 700. The management apparatus 100 creates, for example, 25 combinations of five VM types relating to a VM D and five VM types relating to a VM E based on the VM type table 600. The VM types are, for example, Low Spec, CPU Rich, MEM Rich, NET Rich, High Spec and so forth. The management apparatus 100 stores the created combinations by setting the combinations to fields of VM D and VM E in records of the VM operating situation sheet 700.

This makes it possible for the management apparatus 100 to take comparatively many variations in which a HW resource is deployed to a plurality of VMs that provide a certain service into consideration. Further, since the management apparatus 100 takes variations in which a HW resource is deployed to a plurality of VMs in a unit of a VM type into consideration, it is possible to reduce the number of variations to be considered and achieve reduction of the burden to be imposed when minimization of HW resources is investigated. Now, description is given of FIG. 24.

Referring to FIG. 24, the management apparatus 100 selects a combination in regard to which the HW resource is smallest from among one or more combinations of the VM types of the VM D in which the VM types are made variable and the VM type of the VM E in which the VM types remain fixed. In the example of FIG. 24, the management apparatus 100 selects a record 2400 of the VM operating situation sheet 700. The management apparatus 100 deploys the VMs D and E to a plurality of information processing apparatus 101 and executes a benchmark such that the VM types of the VMs D and E are changed based on the selected record 2400.

Thereafter, the management apparatus 100 acquires 4 CPU, 16 GB, 1 Gbit/s×2 and so forth as information of the size of the HW resource to be used in a service and stores them by setting them to the field for total HW resource of the VM operating situation sheet 700. The management apparatus 100 acquires a processing amount 90 ops of the service and stores it by setting it to the field for service performance of the VM operating situation sheet 700. Now, description is given with reference to FIG. 25.

In FIG. 25, the management apparatus 100 selects a combination in regard to which the HW resource is greatest from among one or more combinations of the VM types of the VM D in which the VM types are made variable and the VM types of the VM E in which the VM types remain fixed. In the example of FIG. 25, the management apparatus 100 selects a record 2500 of the VM operating situation sheet 700. The management apparatus 100 deploys the VMs D and E to a plurality of information processing apparatus 101 and executes a benchmark such that the VM types of the VMs D and E are changed based on the selected record 2500.

Thereafter, the management apparatus 100 acquires 6 CPU, 24 GB, 1 Gbit/s×1+10 Gbit/s×1 and so forth as information of the size of the HW resource to be used in a service and stores them by setting them to the field for total HW resource of the VM operating situation sheet 700. The management apparatus 100 acquires a processing amount 104 ops of the service and stores it by setting it to the field for service performance of the VM operating situation sheet 700. Now, description is given with reference to FIG. 26.

In FIG. 26, the management apparatus 100 decides whether or not, in the case where the combination of VM types is changed from the combination in which the HW resource is smallest corresponding to the record 2400 to another combination in which the HW resource is greatest corresponding to the record 2500, the processing amount of the service is improved by 10% or more. Since the processing amount is improved by 10% or more, the management apparatus 100 does not omit processes for the other combinations between the combination in which the HW resource is smallest corresponding to the record 2400 and the combination in which the HW resource is greatest corresponding to the record 2500.

In the example of FIG. 26, the management apparatus 100 successively selects records 2600 to 2602 of the VM operating situation sheet 700. First, the management apparatus 100 deploys the VMs D and E to the plurality of information processing apparatus 101 and executes a benchmark such that the VM types of the VMs D and E are changed based on the selected record 2600.

Thereafter, the management apparatus 100 acquires 6 CPU, 16 GB, 1 Gbit/s×2 and so forth as information of the size of the HW resource to be used in a service and stores them by setting them to the field for total HW resource of the VM operating situation sheet 700. The management apparatus 100 acquires a processing amount 90 ops of the service and stores it by setting it to the field for service performance of the VM operating situation sheet 700.

The management apparatus 100 deploys the VMs D and E to the plurality of information processing apparatus 101 and executes a benchmark such that the VM types of the VMs D and E are changed based on the selected record 2601.

Thereafter, the management apparatus 100 acquires 4 CPU, 24 GB, 1 Gbit/s×2 and so forth as information of the size of the HW resource to be used in a service and stores them by setting them to the field for total HW resource of the VM operating situation sheet 700. The management apparatus 100 acquires a processing amount 96 ops of the service and stores it by setting it to the field for service performance of the VM operating situation sheet 700.

The information processing apparatus 101 deploys the VMs D and E to the plurality of information processing apparatus 101 and executes a benchmark such that the VM types of the VMs D and E are changed based on the selected record 2602.

Thereafter, the management apparatus 100 acquires 4 CPU, 16 GB, 1 Gbit/s×1+10 Gbit/s×1 and so forth as information of the size of the HW resource to be used in the service and stores them by setting them to the field for total HW resource of the VM operating situation sheet 700. The management apparatus 100 acquires a processing amount 94 ops of the service and stores it by setting it to the field for service performance of the VM operating situation sheet 700. Thereafter, the management apparatus 100 similarly sets the field for total HW resource and the field for service performance of the VM operating situation sheet 700. Now, description is given with reference to FIG. 27.

In FIG. 27, the management apparatus 100 selects a combination in regard to which the total HW resource is smallest from among combinations of the VM types in which the service performance satisfies a target service performance in the VM operating situation sheet 700. The target service performance is a performance value corresponding to the SLA. Then, the management apparatus 100 deploys the VMs D and E in the selected combination of VM types to the plurality of information processing apparatus 101.

In the example of FIG. 27, the management apparatus 100 particularly selects a combination of VR types corresponding to a record 2700 from among combinations of VM types in which the processing amount of the service performance is greater than the processing amount of the target service performance and by which the SLA is satisfied. Then, the management apparatus 100 deploys the VMs D and E with the combination of VM types to the plurality of information processing apparatus 101.

Consequently, the management apparatus 100 may minimize the HW resource to be used in the service within a range within which the SLA is satisfied. Therefore, the management apparatus 100 may achieve reduction of the power consumption relating to the service. Further, the management apparatus 100 may assure a HW resource that may be utilized for a different service and may be made possible to provide more services on the information processing system 110. Furthermore, when the load of a certain service increases suddenly, the management apparatus 100 may assure empty HW resources to which the service may be deployed and the enhancement of the stability of the information processing system 110 may be achieved.

Although a case is described here in which the management apparatus 100 creates a plurality of combinations of HW resources in a unit of a VM type, this is not restrictive.

For example, the management apparatus 100 may specify a size of a HW resource capable of being deployed to each VM and create a plurality of combinations of HW resources capable of being deployed to each of the VMs.

For example, the management apparatus 100 specifies a minimum number and a maximum number of CPUs that may be deployed to each VM, partitions the interval between the minimum number and the maximum number in a given unit and specifies a plurality of candidates that becomes a number of CPUs to be deployed to each of the VMs. Similarly, the management apparatus 100 specifies a plurality of candidates for a storage capacity to be applied to each VM and a plurality of candidates for a network bandwidth. Then, the management apparatus 100 combines the candidates to create a plurality of combinations of HW resources to be deployed to each VM and sets the combinations to the VM operating situation sheet 700.

Example of Management Processing Procedure in Working Example 2

Now, an example of a management processing procedure in the working example 2 is described with reference to FIGS. 28 to 31.

Figure 28:
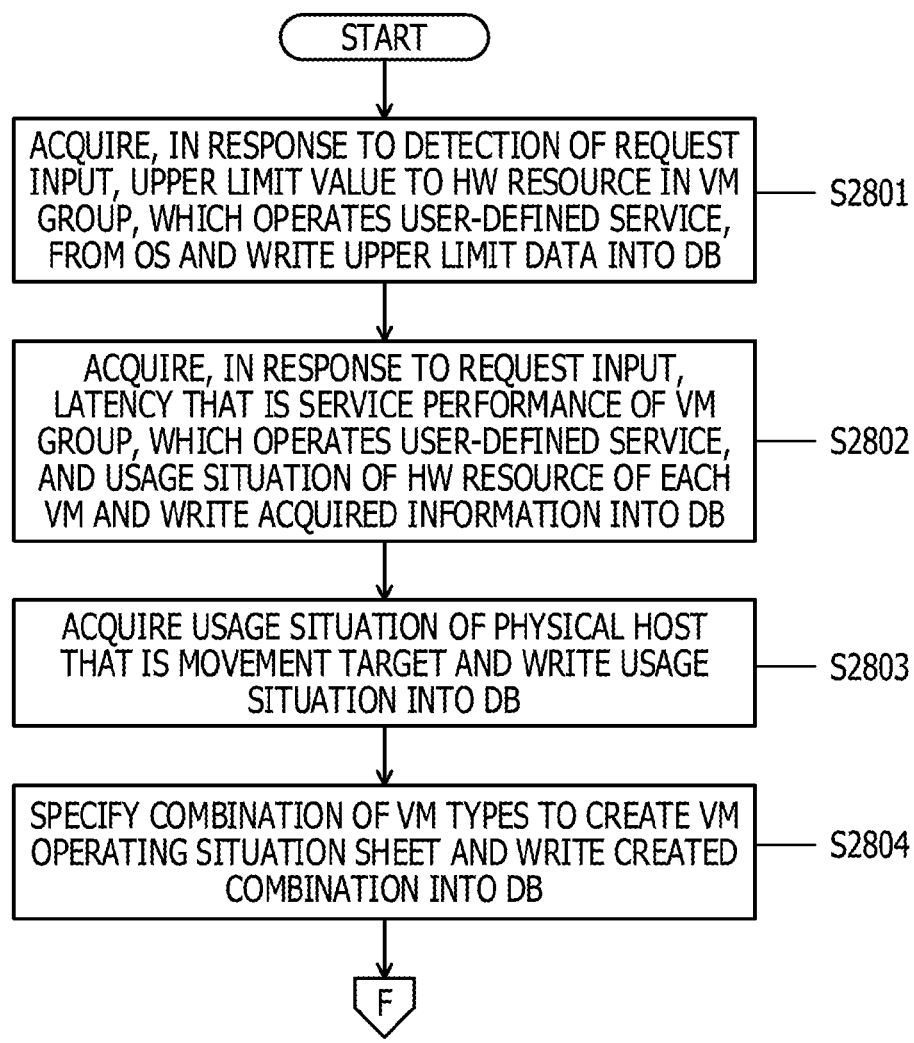
FIG. 28 is a flow chart (part 1) depicting an example of a management processing procedure in a working example 2.

FIGS. 28 to 31 are flow charts depicting the example of a management processing procedure in a working example 2. Referring to FIG. 28, the data acquisition unit 905 acquires an upper limit to a HW resource in a VM group, which operates a user-defined service, from the OS in response to detection of a request input generated by the timer unit 904 and writes the upper limit value into the DB 901 (S2801).

The data acquisition unit 905 acquires a processing amount that is a service performance and a usage situation of a HW resource of each VM in regard to the VM group that is to operate the user-defined service in response to a request input and writes the acquired processing amount and usage situation into the DB 901 (S2802).

The data acquisition unit 905 acquires and writes a usage situation of a physical host that is a movement target into the DB 901 (S2803). The data acquisition unit 905 specifies combinations of VM types and creates and writes a VM operating situation sheet 700 into the DB 901 (S2804). The management apparatus 100 advances the processing to a process at S1901 of FIG. 29.

Figure 29A:
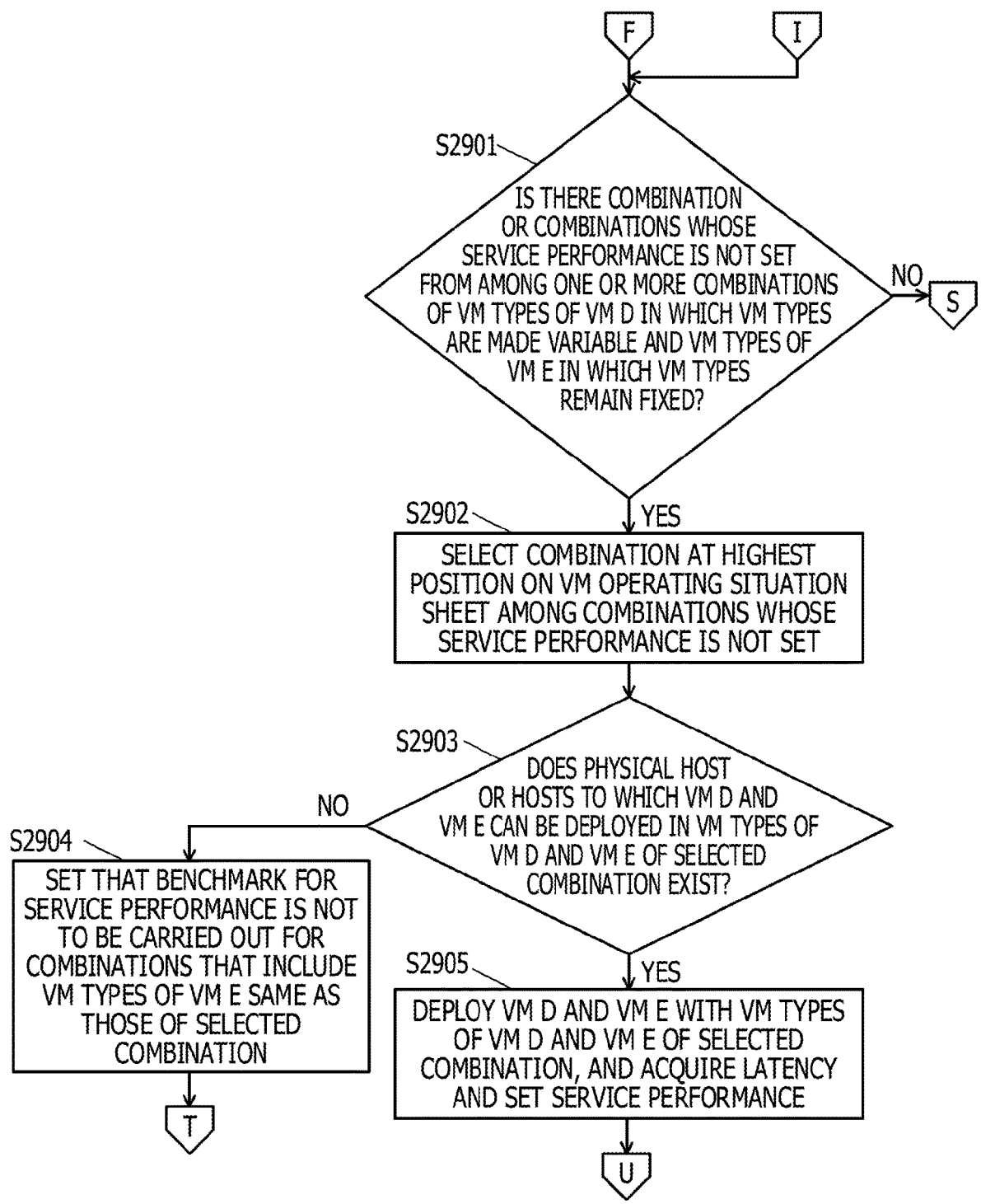
FIGS. 29A and 29B are flow charts (part 2) depicting the example of a management processing procedure in a working example 2.

Referring to FIG. 29A, the data acquisition unit 905 decides whether or not there is a combination or combinations whose service performance is not set on the VM operating situation sheet 700 from among one or more combinations of the VM types of the VM D in which the VM types are made variable and the VM types of the VM B and the VM C in which the VM types remain fixed (S2901). Here, in the case where there is not any combination whose service performance is not set (S2901: No), the management apparatus 100 advances the processing to a process at S3001 of FIG. 30.

On the other hand, in the case where there is a combination or combinations whose service performance is not set (S2901: Yes), the data acquisition unit 905 selects a combination that is at the highest position on the VM operating situation sheet 700 among the combinations whose service performance is not set (S2902).

The control policy determination unit 907 decides whether or not there exists a physical host or hosts to which the VM D and VM E may be deployed in VM types of the VM D and VM E of the selected combination (S2903). Here, in the case where no such physical host exists (S2903: No), the control policy determination unit 907 sets that the benchmark for the service performance is not to be carried out for combinations that include the VM types of the VM E same as those of the selected combination (S2904). The management apparatus 100 advances the processing to a process at S3001 of FIG. 30.

On the other hand, in the case where such a physical host as described above exists (S2903: Yes), the control policy determination unit 907 deploys the VM D and VM E with the VM types of the VM D and VM E of the selected combination, and acquires the processing amount in regard to the combination and sets a service performance (S2905).

Figure 29B:
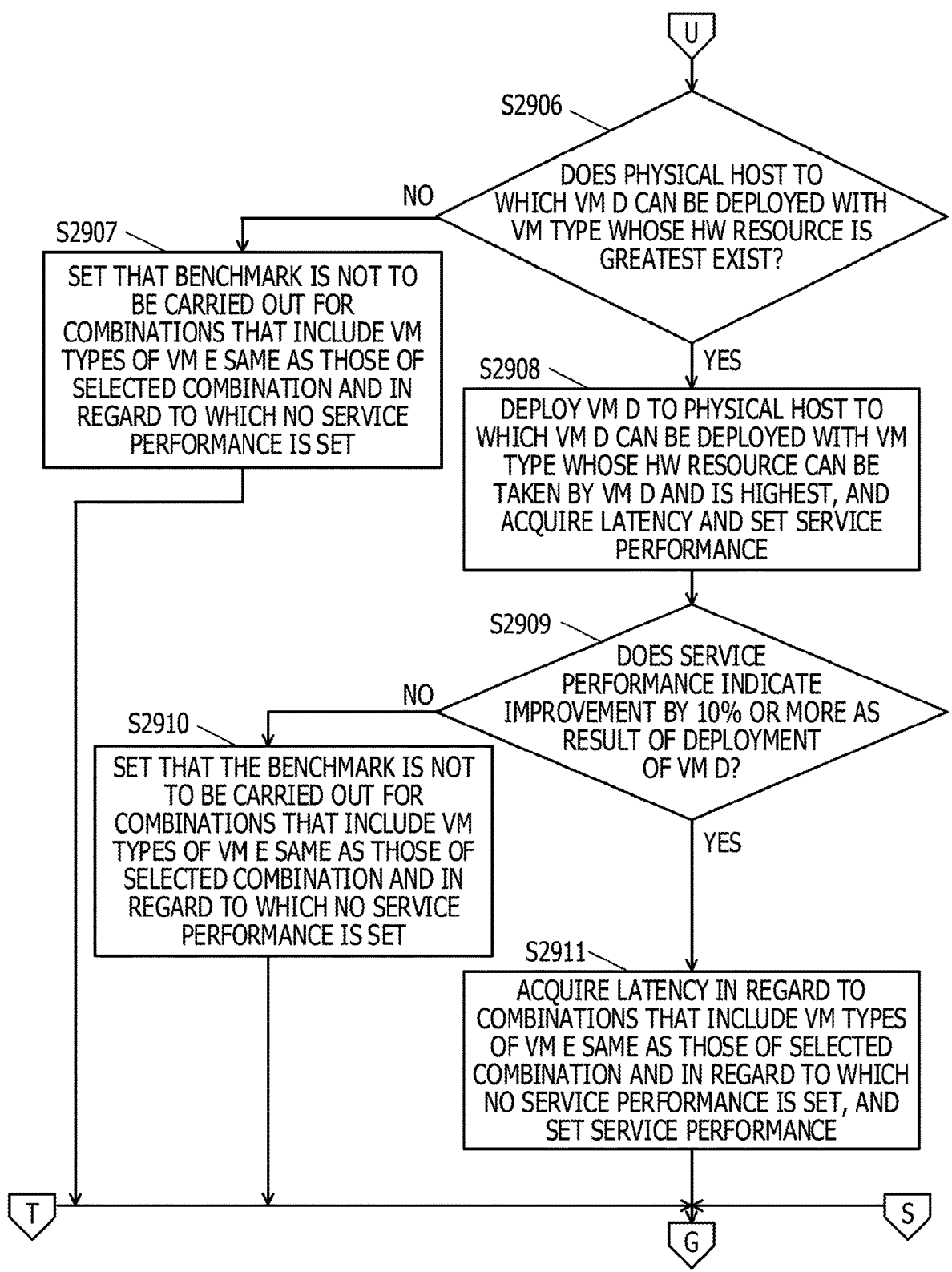

Referring to FIG. 29B, the control policy determination unit 907 decides whether or not there exists a physical host to which the VM D may be deployed with the VM type whose HW resource is greatest (S2906). Here, in the case where no such physical host exists (S2906: No), the control policy determination unit 907 sets that the benchmark for the service performance is not to be carried out for combinations that include the VM types of the VM E same as those of the selected combination and in regard to which no service performance is set (S2907). The management apparatus 100 advances the processing to a process at S3001 of FIG. 30.

On the other hand, in the case where such a physical host as described above exists (S2906: Yes), the control policy determination unit 907 deploys the VM D to a physical host to which the VM D may be deployed with the VM type whose HW resource may be taken by the VM D and is highest, and acquires the processing amount and sets a service performance (S2908).

The control policy determination unit 907 decides whether or not the service performance indicates improvement by 10% or more as a result of the deployment of the VM D (S2909). Here, in the case where the service performance does not indicate such improvement (S2909: No), the control policy determination unit 907 sets that the benchmark for the service performance is not to be carried out for combinations that include the VM types of the VM E same as those of the selected combination and in regard to which no service performance is set (S2910). The management apparatus 100 advances the processing to a process at S3001 of FIG. 30.

On the other hand, in the case where the service performance indicates such improvement as described above (S2909: Yes), the control policy determination unit 907 advances acquires the processing amount in regard to combinations that include the VM types of the VM E same as those of the selected combination and in regard to which no service performance is set, and sets a service performance (S2911). The management apparatus 100 advances the processing to a process at S3001 of FIG. 30.

Figure 30A:
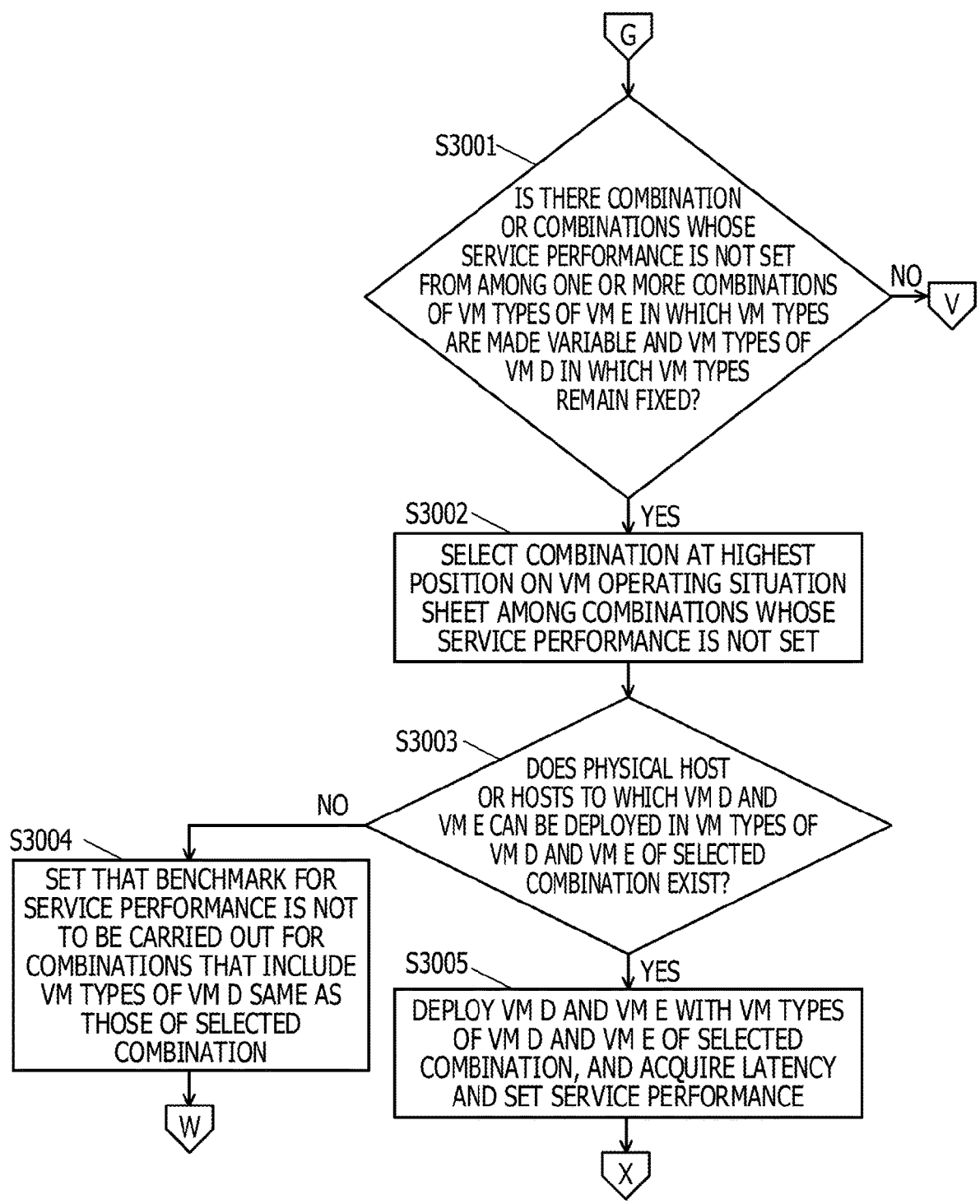
FIGS. 30A and 30B are flow charts (part 3) depicting the example of a management processing procedure in a working example 2.

Referring to FIG. 30A, the data acquisition unit 905 decides whether or not there exists a combination or combinations whose service performance is not set on the VM operating situation sheet 700 from among one or more combinations of the VM types of the VM E in which the VM types are made variable and the VM types of the VM D in which the VM types remain fixed (S3001). Here, in the case where there is not any combination whose service performance is not set (S3001: No), the management apparatus 100 advances the processing to a process at S3101 of FIG. 31.

On the other hand, in the case where there is a combination or combinations whose service performance is not set (S3001: Yes), the data acquisition unit 905 selects a combination that is at the uppermost position on the VM operating situation sheet 700 among the combinations whose service performance is not set (S3002).

The control policy determination unit 907 decides whether or not there exists a physical host to which the VM D and VM E may be deployed with the VM types of the VM D and VM E of the selected combination (S3003). Here, in the case where no such physical host exists (S3003: No), the control policy determination unit 907 sets that the benchmark for the service performance is not to be carried out for combinations that include the VM types of the VM D same as those of the selected combination (S3004). Then, the management apparatus 100 advances the processing to a process at S3101 of FIG. 31.

On the other hand, in the case where such a physical host as described above exists (S3003: Yes), the control policy determination unit 907 deploys the VM D and VM E with the VM types of the VM D and VM E of the selected combination, and acquires the processing amount in regard to the combination and sets a service performance (S3005).

Figure 30B:
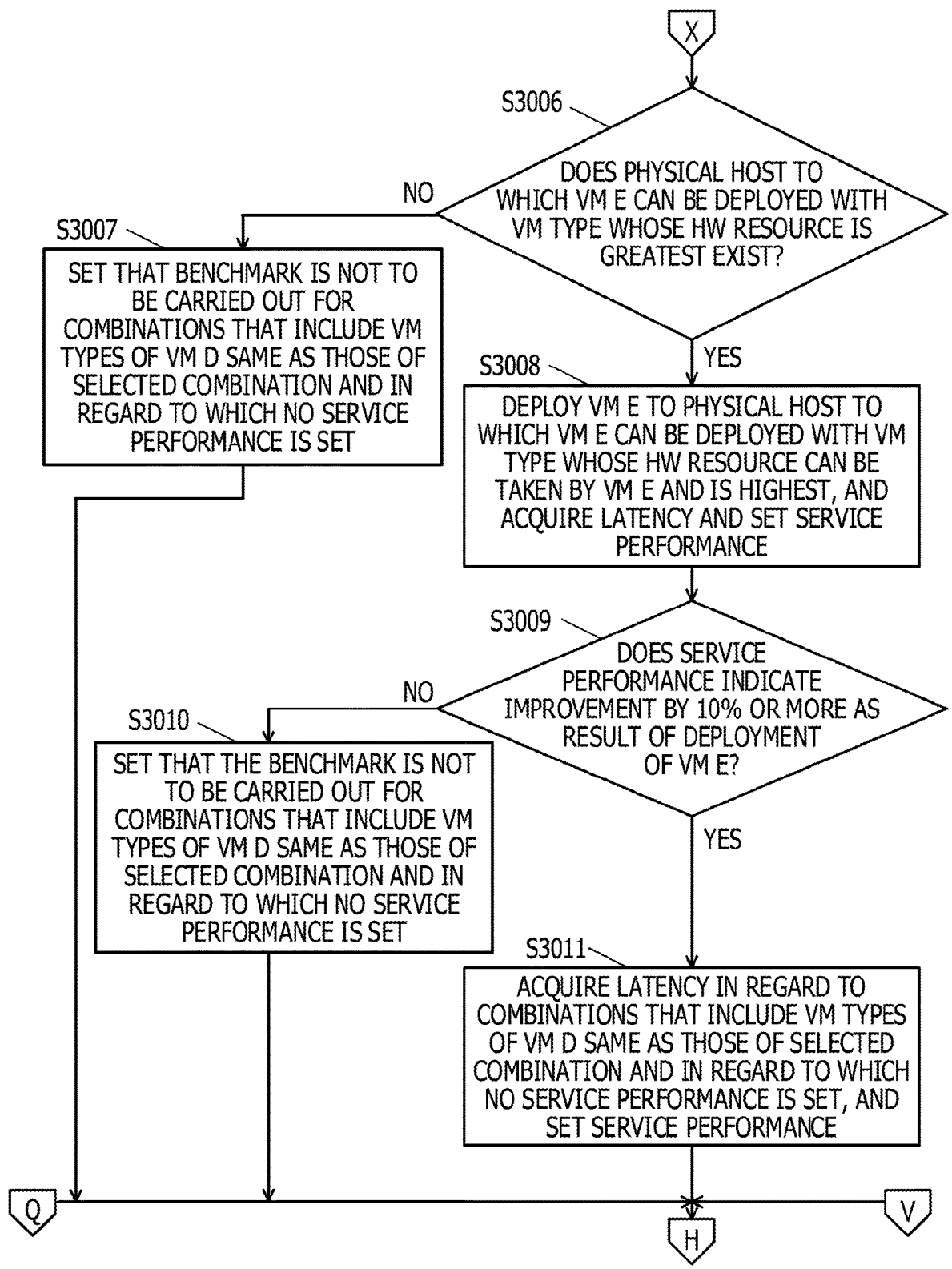

Referring to FIG. 30B, the control policy determination unit 907 decides whether or not there exists a physical host to which the VM E may be deployed with the VM type whose HW resource is greatest (S3006). Here, in the case where no such physical host exists (S3006: No), the control policy determination unit 907 sets that the benchmark for the service performance is not to be carried out for combinations that include the VM types of the VM D same as those of the selected combination and in regard to which no service performance is set (S3007). The management apparatus 100 advances the processing to a process at S3101 of FIG. 31.

On the other hand, in the case where such a physical host as described above exists (S3006: Yes), the control policy determination unit 907 deploys the VM E to a physical host to which the VM E may be deployed with the VM type whose HW resource may be taken by the VM E and is highest, and acquires the processing amount and sets a service performance (S3008).

The control policy determination unit 907 decides whether or not the service performance indicates improvement by 10% or more as a result of the deployment of the VM E (S3009). Here, in the case where the service performance does not indicate such improvement (S3009: No), the control policy determination unit 907 sets that the benchmark for the service performance is not to be carried out for combinations that include the VM types of the VM D same as those of the selected combination and in regard to which no service performance is set (S3010). The management apparatus 100 advances the processing to a process at S3101 of FIG. 31.

On the other hand, in the case where the service performance indicates such improvement as described above (S3009: Yes), the control policy determination unit 907 acquires the processing amount in regard to combinations that include the VM types of the VM D same as those of the selected combination and in regard to which no service performance is set, and sets a service performance (S3011). The management apparatus 100 advances the processing to a process at S3101 of FIG. 31.

Referring to FIG. 31, the data acquisition unit 905 calculates and sets a total HW resource to the VM operating situation sheet 700 (S3101). The data acquisition unit 905 refers to the DB 901 to decide whether or not there exists a combination whose service performance is not set on the VM operating situation sheet 700 (S3102). Here, in the case where there exists a combination whose service performance is not set (S3102: Yes), the management apparatus 100 advances the processing to the process at S2901 of FIG. 29.

On the other hand, in the case where there is no combination whose service performance is not set (S3102: No), the movement target selection unit 906 refers to the DB 901 to decide whether or not there exists a service performance that satisfies the SLA on the VM operating situation sheet 700 (S3103). Here, in the case where there exists no service performance that satisfies the SLA (S3103: No), the management apparatus 100 ends the management process.

On the other hand, in the case where there exists a service performance that satisfies the SLA (S3103: Yes), the control policy determination unit 907 selects a combination that satisfies the SLA and whose total HW resource is smallest (S3104). The control policy determination unit 907 deploys the VMs such that the selected combination is established (S3105). The management apparatus 100 ends the management process. This makes it possible for the management apparatus 100 to minimize the HW resource to be used in the service within a range within which the SLA is satisfied.

As described above, according to the management apparatus 100, it may acquire, for each of a plurality of groups to each of which a plurality of information processing apparatus 101 belong and each of which provides a given service, configuration information and performance information of each information processing apparatus 101 and store the acquired information into a storage unit. Further, the management apparatus 100 may select, for each of the plurality of groups, a movement target virtual machine, which becomes a movement target from a target group to which a virtual machine of a selection target belongs to a different group, based on the configuration information and the performance information stored for each of the plurality of groups in the storage unit. Furthermore, according to the management apparatus 100, in the case where the movement target virtual machine is moved to the different group, when a performance value of a service corresponding to the movement target virtual machine satisfies a reference value determined in advance, the management apparatus 100 may determine the movement of the movement target virtual machine from the target group to the different group. Consequently, the management apparatus 100 may specify a group whose HW resource to be used for a service is possibly smaller than that of the target group within a range within which the SLA is satisfied. Then, the management apparatus 100 may move the VMs A to C to the different group that satisfies the SLA to achieve minimization of the HW resource.

According to the management apparatus 100, a virtual machine type according to the configuration information of each information processing apparatus 101 may be stored for each of a plurality of groups into the storage unit. Further, the management apparatus 100 may select a movement target virtual machine for each of the plurality of groups based on the virtual machine type and the performance information stored for each of the plurality of groups in the storage unit. This makes it possible for the management apparatus 100 to take variations of combinations of HW resources to be applied to a plurality of VMs into consideration in a unit of a VM type. Therefore, the management apparatus 100 may reduce the number of variations to be considered and may achieve reduction of the burden imposed when minimization of HW resources is investigated.

According to the management apparatus 100, it may be decided whether or not a performance value of a service corresponding to a movement target virtual machine in the case where the movement target virtual machine is moved to a different apparatus is better than the performance value of the service corresponding to the movement target virtual machine before the movement. Further, the management apparatus 100 may determine movement of the movement target virtual machine from the target group to the different apparatus when the performance value satisfies a reference value and besides is good. Consequently, since the management apparatus 100 moves a VM in the case where the performance value of the service becomes better than the current performance value, enhancement of the performance value of the service may be achieved efficiently.

According to the management apparatus 100, it may determine movement of the movement target virtual machine from the target group to the different group when calculation resources of the different group are less than calculation resources of the target group. Consequently, since the management apparatus 100 moves a VM in the case where the HW resource to be used in the service decreases from that at present, minimization of calculation resources to be used in the service may be achieved efficiently.

According to the management apparatus 100, it may decide whether or not performance information of a group whose performance information is not acquired as yet is to be acquired based on the configuration information and the performance information acquired already, and may acquire performance information of a group in regard to which it is decided to acquire performance information and store the acquired performance information into the storage unit. This makes it possible to reduce the period of time required when the management apparatus 100 deploys VMs to the information processing apparatus 101 and executes a bench mark to acquire performance information and reduce the burden to be imposed on the management apparatus 100.

A control method for the information processing system described hereinabove in connection with the present embodiment may be implemented by executing a program prepared in advance using a computer such as a personal computer or a work station. A management program for the management apparatus described in connection with the present embodiment is executed by being recorded on a computer-readable recording medium such as a hard disk, a flexible disk, a compact disc read only memory (CD-ROM), an magnetooptic disc (MO) or a digital versatile disc (DVD) and read out from the recording medium by a computer. Further, the management program for the management apparatus described hereinabove in connection with the present embodiment may be distributed through a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management apparatus that manages an information processing system that includes a plurality of information processing apparatuses, the information processing system being configured to provide one service using a plurality of virtual machines executed by the plurality of information processing apparatuses, the management apparatus comprising:
- a memory; and
- a processor coupled to the memory and configured to:
  - store configuration information and performance information for each of the plurality of information processing apparatuses acquired from a host OS executed by each of a plurality of groups to which the plurality of information processing apparatuses belong into the memory for each of the plurality of groups, each of the plurality of virtual machines being assigned to one or more groups of the plurality of groups so as to be executed by the one of more groups;
  - select, for each of the plurality of groups, a movement target virtual machine in the plurality of virtual machines whose assignment is to be changed from a target group of the plurality of groups to another group of the plurality of groups based on the configuration information and the performance information stored for each of the plurality of groups in the memory;
  - determine, for each of the plurality of groups, whether the one service to be provided by the plurality of virtual machines satisfies a reference value when the assignment of the movement target virtual machine is changed to the another group; and
  - when it is determined that the one service satisfies the reference value, determine to change the assignment of the movement target virtual machine from the target group to the another group,
- wherein the processor is further configured to:
  - when the assignment of the movement target virtual machine is changed to the another group, determine whether a performance value of the one service after changing the assignment satisfies the reference value and determine whether the performance value of the one service is better than a performance value of the one service before changing the assignment, and
  - when it is determined that the performance value after changing the assignment satisfies the reference value and besides is better, determine to change the assignment of the movement target virtual machine from the target group to the another group.

2. The management apparatus according to claim 1, wherein the processor is configured to:
- store a virtual machine type according to the configuration information of the information processing apparatus for each of the plurality of groups into the memory, and
- select the movement target virtual machine for each of the plurality of groups based on the virtual machine type and the performance information stored for each of the plurality of groups in the memory.

3. The management apparatus according to claim 1, wherein the processor is configured to when calculation resources of the target group are less than calculation resources of the different group, determine to move the movement target virtual machine from the target group to the another group.

4. The management apparatus according to claim 1, wherein the reference value is determined based on a service level agreement (SLA) related to the given service.

5. The management apparatus according to claim 1, wherein the processor is configured to calculate the performance value of the one service based on the performance information of the plurality of information processing apparatuses that belong to the another group.

6. The management apparatus according to claim 1, wherein the performance value of the one service is a latency of a client apparatus used by a user of the one service, the latency being determined from a latency of each of the plurality of information processing apparatuses.

7. The management apparatus according to claim 1, wherein the performance value of the one service is a throughput of a client apparatus used by a user of the one service, the throughput being determined from a throughput of each of the plurality of information processing apparatuses.

8. A control method executed by a processor included in a management apparatus that manages an information processing system that includes a plurality of information processing apparatuses, the information processing system being configured to provide one service using a plurality of virtual machines executed by the plurality of information processing apparatuses, the control method comprising:
- storing configuration information and performance information for each of the plurality of information processing apparatuses acquired from a host OS executed by each of a plurality of groups to which the plurality of information processing apparatuses belong into the memory for each of the plurality of groups, each of the plurality of virtual machines being assigned to one or more groups of the plurality of groups so as to be executed by the one or more groups;
- selecting, for each of the plurality of groups, a movement target virtual machine in the plurality of virtual machines whose assignment is to be changed from a target group of the plurality of groups to another group of the plurality of groups based on the configuration information and the performance information stored for each of the plurality of groups in the memory;
- determining, for each of the plurality of groups, whether the one service to be provided by the plurality of virtual machines satisfies a reference value when the assignment of the movement target virtual machine is changed to the another group;
- when it is determined that the one service satisfies the reference value, determining to change the assignment of the movement target virtual machine from the target group to the another group,
- when the assignment of the movement target virtual machine is changed to the another group, determine whether a performance value of the one service after changing the assignment satisfies the reference value and determine whether the performance value of the one service is better than a performance value of the one service before changing the assignment, and
- when it is determined that the performance value after changing the assignment satisfies the reference value and besides is better, determine to change the assignment of the movement target virtual machine from the target group to the another group.

9. The control method according to claim 8, further comprising
- storing a virtual machine type according to the configuration information of the information processing apparatus for each of the plurality of groups into the memory,
- wherein the selecting includes selecting the movement target virtual machine for each of the plurality of groups based on the virtual machine type and the performance information stored for each of the plurality of groups in the memory.

10. The control method according to claim 8, further comprising when calculation resources of the target group are less than calculation resources of the another group, determining to change the assignment from the target group to the another group.

11. The control method according to claim 8, wherein the processor is configured to select, for each of the plurality of groups, a virtual machine whose hardware resource allocation is changed when a plurality of virtual machines is arranged in the plurality of information processing apparatuses that belong to a group as the movement target virtual machine, from among the plurality of virtual machines.

12. The control method according to claim 8, wherein the configuration information includes a CPU number, a storage capacity, and a network bandwidth.

13. A non-transitory computer-readable storage medium storing a program that causes a management apparatus to execute a process, the management apparatus managing an information processing system that includes a plurality of information processing apparatus, the information processing system being configured to provide one service using a plurality of virtual machines executed by the plurality of information processing apparatuses, the process comprising:

storing configuration information and performance information for each of the plurality of information processing apparatuses acquired from a host OS executed by each of a plurality of groups to which the plurality of information processing apparatuses belong into the memory for each of the plurality of groups, each of the plurality of virtual machines being assigned to one or more groups of the plurality of groups so as to be executed by the one or more groups;

selecting, for each of the plurality of groups, a movement target virtual machine in the plurality of virtual machines whose assignment is to be changed from a target group of the plurality of groups to another group of the plurality of groups based on the configuration information and the performance information stored for each of the plurality of groups in the memory;

determining, for each of the plurality of groups, whether the one service to be provided by the plurality of virtual machines satisfies a reference value when the assignment of the movement target virtual machine is changed to the another group;

when it is determined that the one service satisfies the reference value, determining to change the assignment of the movement target virtual machine from the target group to the another group, when the assignment of the movement target virtual machine is changed to the another group, determine whether a performance value of the one service after chancing the assignment satisfies the reference value and determine whether the performance value of the one service is better than a performance value of the one service before changing the assignment, and when it is determined that the performance value after changing the assignment satisfies the reference value and besides is better, determine to change the assignment of the movement target virtual machine from the target group to the another group.

\* \* \* \* \*